US008643979B2

(12) United States Patent
Gao

(10) Patent No.: US 8,643,979 B2
(45) Date of Patent: Feb. 4, 2014

(54) TAPERED SINGLE POLE MAGNETIC HEADS FOR PERPENDICULAR MAGNETIC RECORDING

(75) Inventor: Kaizhong Gao, Eden Prairie, MN (US)

(73) Assignee: The Regents of the University of California, Oakland, CA (US)

( * ) Notice: Subject to any disclaimer, the term of this patent is extended or adjusted under 35 U.S.C. 154(b) by 2194 days.

(21) Appl. No.: 10/853,310

(22) Filed: May 24, 2004

(65) Prior Publication Data

US 2004/0233578 A1   Nov. 25, 2004

Related U.S. Application Data

(60) Provisional application No. 60/473,328, filed on May 23, 2003.

(51) Int. Cl.
*G11B 5/127* (2006.01)
(52) U.S. Cl.
USPC ........................................... 360/125.03
(58) Field of Classification Search
None
See application file for complete search history.

(56) References Cited

U.S. PATENT DOCUMENTS

| | | | | | |
|---|---|---|---|---|---|
| 3,244,818 | A | * | 4/1966 | Bick et al. ............... | 360/125.01 |
| 4,317,148 | A | * | 2/1982 | Chi .................. | 360/119 |
| 4,873,599 | A | * | 10/1989 | Sueoka .................. | 360/126 |
| 5,142,426 | A | * | 8/1992 | Re et al. ................... | 360/126 |
| 5,680,283 | A |  | 10/1997 | Tanaka et al. | |
| 6,233,116 | B1 | * | 5/2001 | Chen et al. ................... | 360/126 |
| 6,259,583 | B1 | * | 7/2001 | Fontana et al. ............ | 360/126 |
| 6,560,069 | B1 |  | 5/2003 | Litvinov et al. | |
| 6,621,664 | B1 | * | 9/2003 | Trindade et al. .......... | 360/318 |
| 6,728,065 | B2 | * | 4/2004 | Batra et al. ................ | 360/126 |
| 6,791,796 | B2 | * | 9/2004 | Shukh et al. ................ | 360/126 |
| 7,002,775 | B2 | * | 2/2006 | Hsu et al. .................... | 360/125 |
| 7,133,253 | B1 | * | 11/2006 | Seagle et al. ........... | 360/125.65 |
| 2003/0197976 | A1 | * | 10/2003 | Van der Heijden et al. .. | 360/125 |
| 2004/0004786 | A1 | * | 1/2004 | Shukh et al. ............... | 360/126 |
| 2004/0047079 | A1 | * | 3/2004 | Ito et al. ..................... | 360/317 |
| 2004/0252415 | A1 | * | 12/2004 | Shukh et al. ............... | 360/317 |
| 2007/0097546 | A1 | * | 5/2007 | Li et al. ........................ | 360/125 |

OTHER PUBLICATIONS

Kai-Zhong Gao, et al.; Write Field Analysis and Write Pole Design in Perpendicular Recording; Sep. 2002; IEEE Transactions on Magnetics, vol. 38, No. 5, pp. 3521-3527.
Kai-Zhong Gao, et al.; Magnetic Recording Configuration for Densities Beyond 1 Tb/in$^2$ and Data Rates Beyond 1 Gb/s; Nov. 2002; IEEE Transactions on Magnetics, vol. 38, No. 6, pp. 3675-3683.
Kai-Zhong Gao; Transition Jitter Estimates in Tilted and Conventional Perpendicular Recording Media at 1 Tb/in$^2$; IEEE Transactions on Magnetics, vol. 39, No. 2, pp. 704-709, Mar. 2003.

(Continued)

*Primary Examiner* — David D Davis
(74) *Attorney, Agent, or Firm* — Perkins Coie LLP

(57) ABSTRACT

Magnetic recording techniques, devices, and systems under a tilted perpendicular recording configuration. An implementation of such a system may include a magnetic head having a single pole to produce a magnetic field along a perpendicular direction; and a storage medium having a top surface to be substantially perpendicular to the perpendicular direction and positioned to interact with the magnetic field, wherein the storage medium includes (1) a magnetic medium layer that has anisotropy easy axes tilted at a tilting angle with respect to the perpendicular direction, (2) a growth layer beneath the magnetic medium layer, and (3) a soft under layer beneath the growth layer.

16 Claims, 16 Drawing Sheets

(56) References Cited

OTHER PUBLICATIONS

Abarra, E.N., et al., "Longitudinal magnetic recording media with thermal stabilization layers," Applied Physics Letters, 77(16): 2581-2583, Oct. 2000.
Benakli, M., et al., "Micromagnetic Study of Switching Speed in Perpendicular Recording Media," IEEE Transactions on Magnetics, 37(4):1564-1566, Jul. 2001.
Bertero, G.A., et al., "Optimization of Granular Double-Layer Perpendicular Media," IEEE Transactions on Magnetics, 38(4):1627-1631, Jul. 2002.
Bertram, H.N., et al., "Reversal Field versus Pulse Time: Theoretical and Experimental Comparison," IEEE Transactions on Magnetics, 36(5):2447-2449, Sep. 2000.
Bertram, H.N., et al., "SNR and Density Limit Estimates: A Comparison of Longitudinal and Perpendicular Recording," IEEE Transactions on Magnetics, 36(1):4-9, Jan. 2000.
Charap, S.H., et al., "Thermal Stability of Recorded Information at High Densities," IEEE Transactions on Magnetics, 33(1):978-983, Jan. 1997.
Fullerton, E.E., et al., "Antiferromagnetically coupled magnetic media layers for thermally stable high-density recording," Applied Physics Letters, 77(23):3806-3808, Dec. 2000.
Gao, K., et al., "Three Dimensional Micromagnetic Analysis of Write Head Dynamics and Field Patterns," IEEE Transactions on Magnetics, 37(4):1373-1375, Jul. 2001.
Gao, K., et al., "Write field analysis in perpendicular recording using three-dimensional micromagnetic simulation," Journal of Applied Physics, 91(10):8369-8371, May 2002.
Grundy, P.J., "Thin film magnetic recording media," Journal of Physics D: Applied Physics, 31(21):2975-2990, Nov. 1998.
Hee, C.H., et al., "Tilted media by micromagnetic simulation: A possibility for the extension of longitudinal magnetic recording?" Journal of Applied Physics, 91(10):8004-8006, May 2002.
Hughes, G., "Patterned Media Write Designs," IEEE Transactions on Magnetics, 36(2):521-527, Mar. 2000.
Ishida, T., et al., "More Than 1 Gb/in2 Recording on Obliquely Oriented Thin Film Tape," IEEE Transactions on Magnetics, 36(1):183-188, Jan. 2000.
Iwasaki, S., "History of Perpendicular Magnetic Recording—Focused on the Discoveries that Guided the Innovation-," Journal of the Magnetics Society of Japan, 25(7):1361-1369, Jul. 2001.
Iwasaki, S., "Perpendicular Magnetic Recording Focused on the Origin and Its Significance," IEEE Transactions on Magnetics, 38(4):1609-1614, Jul. 2002.
Iwasaki, S., "Perpendicular Magnetic Recording," IEEE Transactions on Magnetics, MAG-16(1):71-76, Jan. 1980.
Iwasaki, S., et al., "An analysis for the magnetization mode for high density magnetic recording," IEEE Transactions on Magnetics, MAG-13(5):1272-1277, Sep. 1977.
Johnson, K.E., "Magnetic materials and structures for thin-film recording media," Journal of Applied Physics, 87(9): 5365-5370, May 2000.
Kneller, E.F., et al., "Particle Size Dependence of Coercivity and Remanence of Single-Domain Particles," Journal of Applied Physics, 34(3):656-658, Mar. 1963.
Lee, K.J., et al., "Recording physics of perpendicular recording with single layered medium and ring head," Journal of Applied Physics, 91(10):8700-8702, May 2002.
Mallary, M., et al., "One Terabit per Square Inch Perpendicular Recording Conceptual Design," IEEE Transactions on Magnetics, 38(4):1719-1724, Jul. 2002.
Richter, H.J., "An Approach to Recording on Tilted Media," IEEE Transactions on Magnetics, 29(5):2258-2265, Sep. 1993.
Safonov, V.L., et al., "'Dynamic-thermal' reversal in a fine micromagnetic grain: Time dependence of coercivity," Journal of Applied Physics, 87(9):5681-5683, May 2000.
Sharrock, M.P., "Time dependence of switching fields in magnetic recording media," Journal of Applied Physics, 76 (10):6413-6418, Nov. 1994.
Stoner, E.C., et al., "A Mechanism of Magnetic Hysteresis in Heterogeneous Alloys," Philosophical Transactions of the Royal Society of London. Series A, Mathematical and Physical Sciences, 240(826):599-642, May 1948.
Toigo, J.W., "Avoiding a Data Crunch," Scientific American, 282(5):58-74, May 2000.
Victora, R.H., "Predicted Time Dependence of the Switching Field for Magnetic Materials," Physical Review Letters, 63(4):457-460, Jul. 1989.
Wang, X., et al., "Thermal-dynamic reversal of fine magnetic grains with arbitrary anisotropy axes orientation," Journal of Applied Physics, 92(4):2064-2072, Aug. 2002.
Weller, D., et al., High Ku Materials Approach to 100 Gbits/in2, IEEE Transactions on Magnetics, 36(1):10-15, Jan. 2000.
Wood, R., "The Feasibility of Magnetic Recording at 1 Terabit per Square Inch," IEEE Transactions on Magnetics, 36 (1):36-42, Jan. 2000.
Zheng, Y.F., et al., "Control of the tilted orientation of CoCrPt/Ti thin film media by collimated sputtering," Journal of Applied Physics, 91(10):8007-8009, May 2002.

* cited by examiner

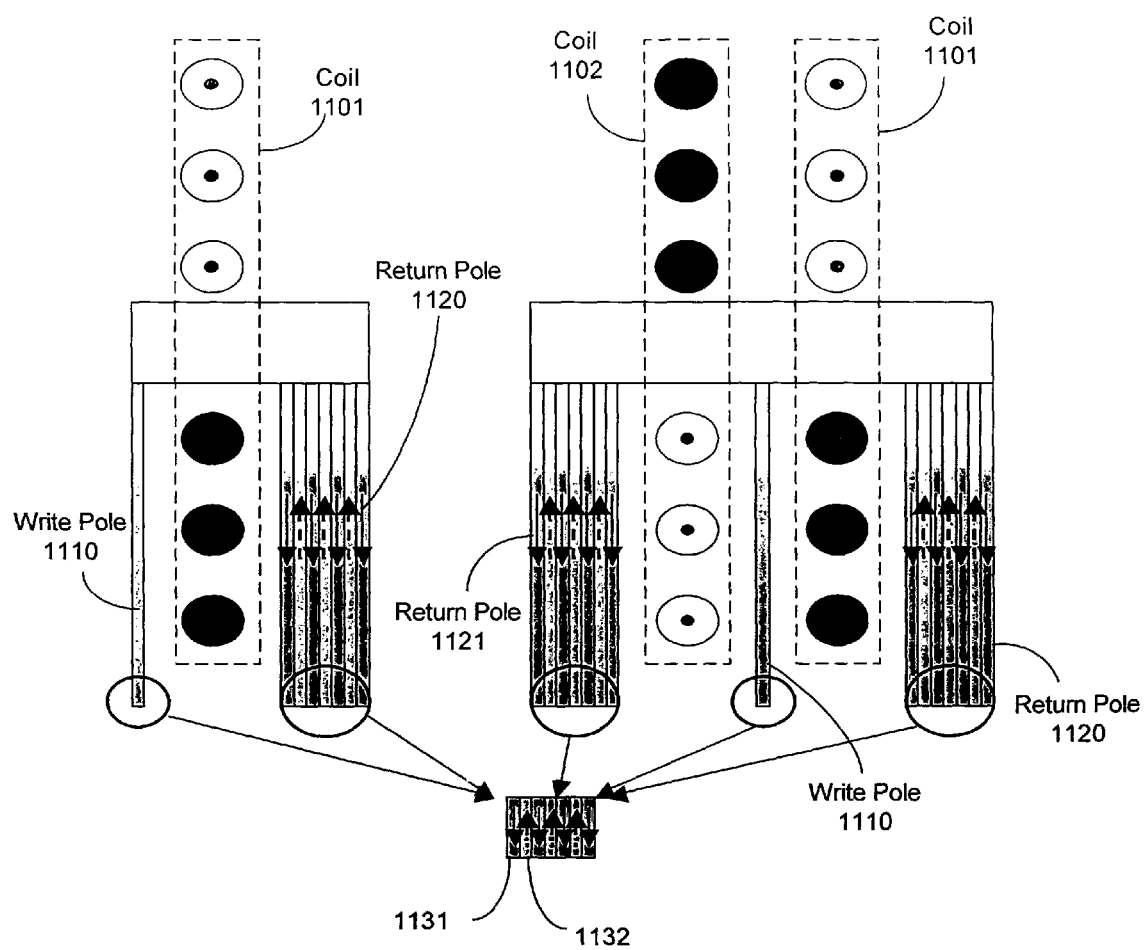
FIG. 11A  FIG. 11B

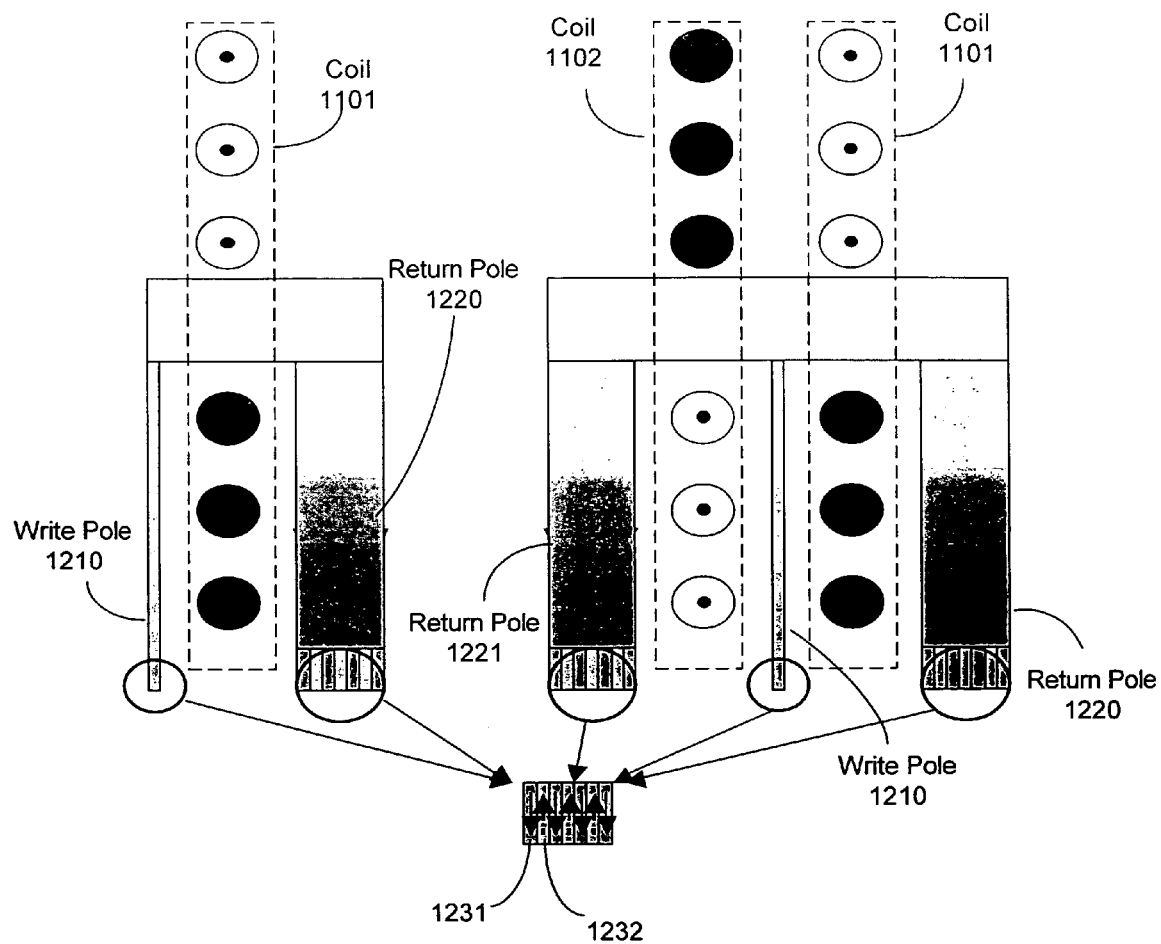
FIG. 12A    FIG. 12B

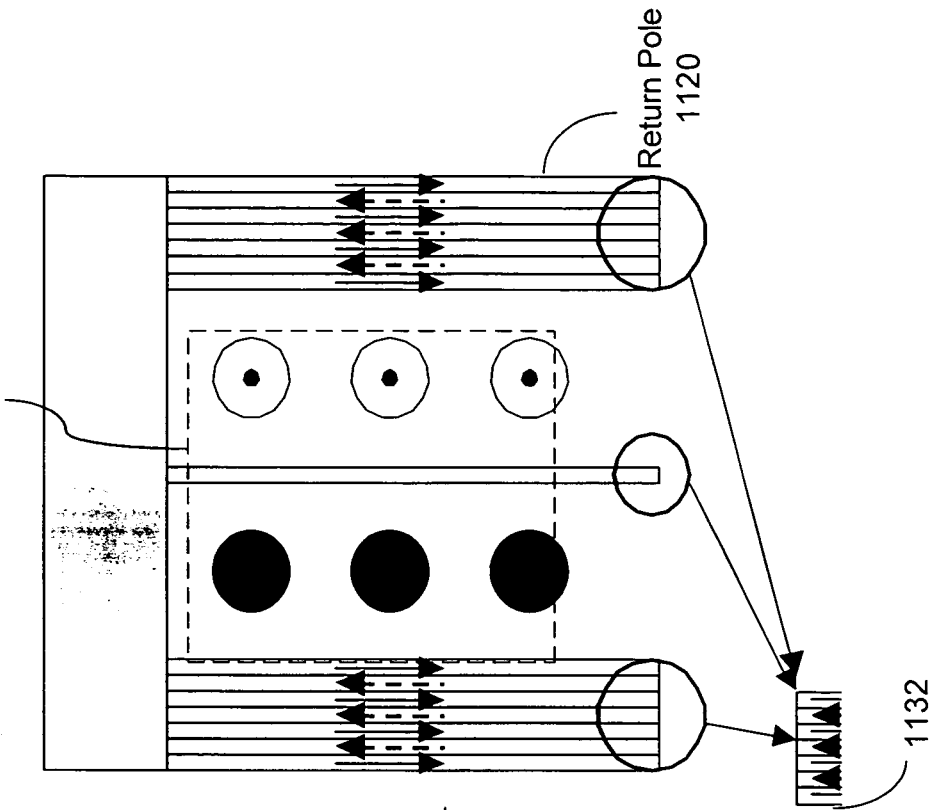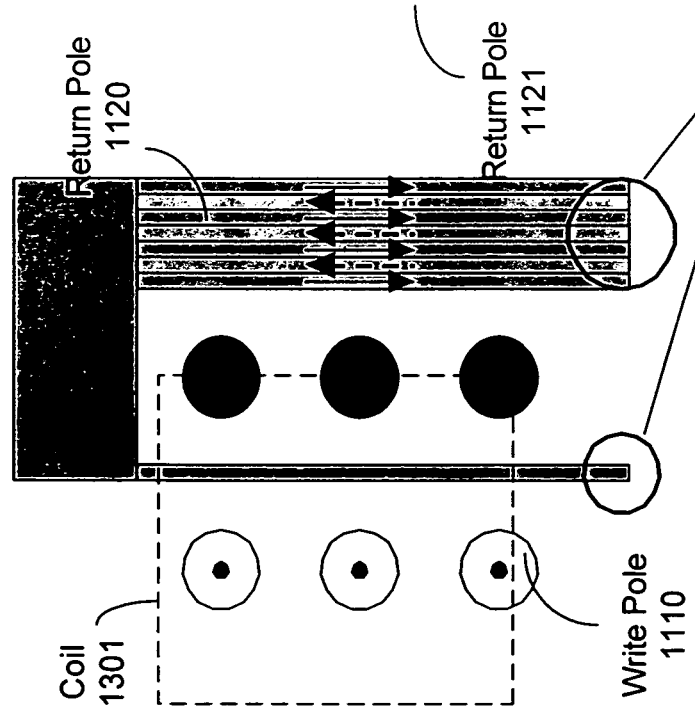

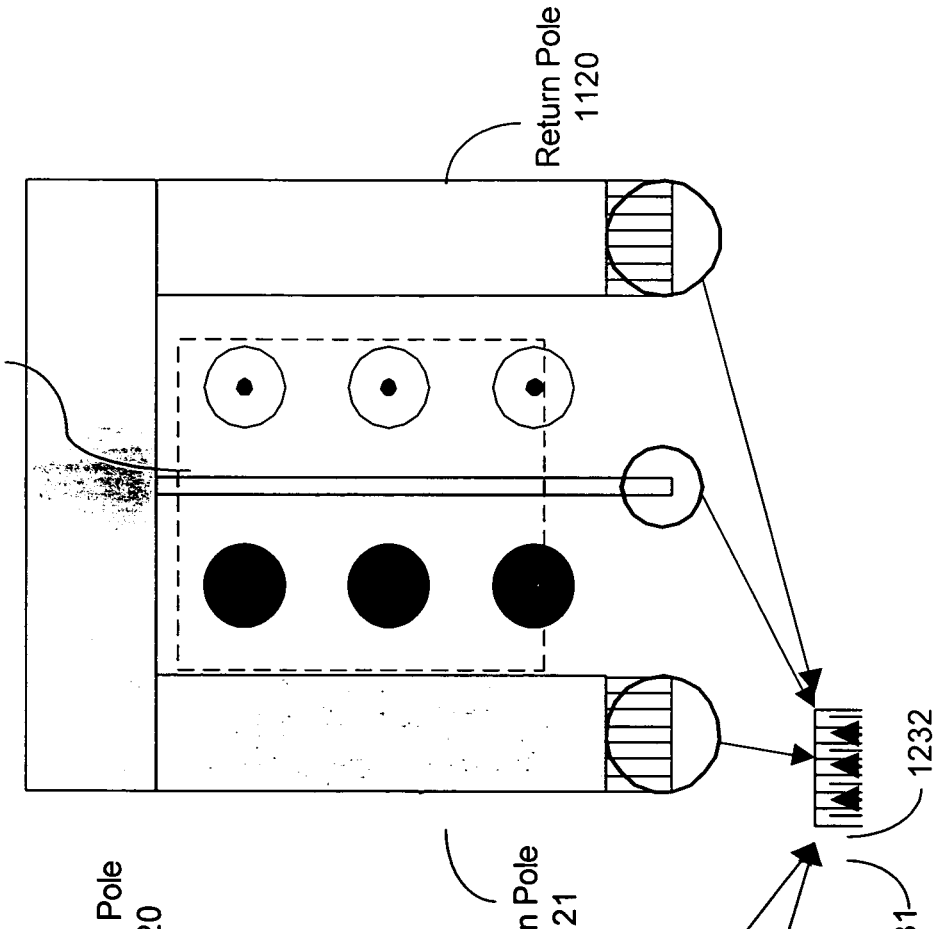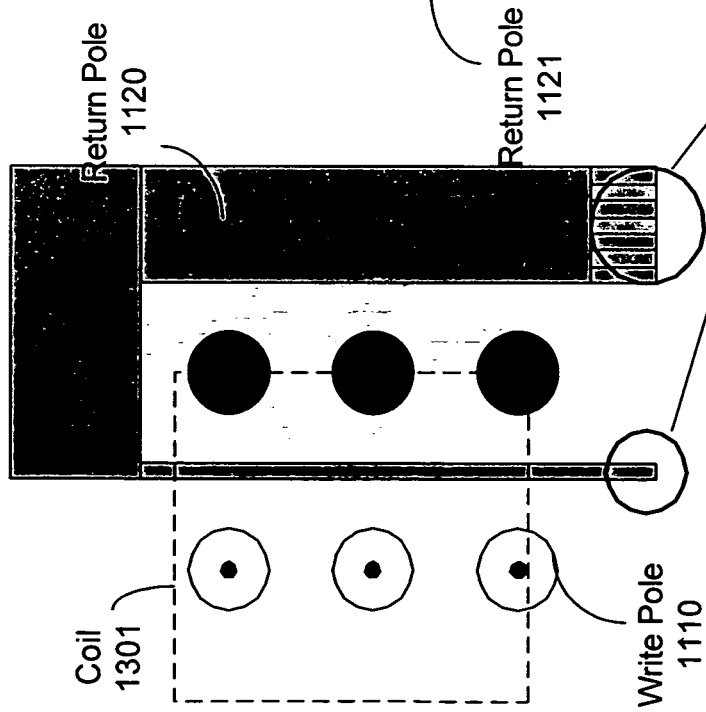

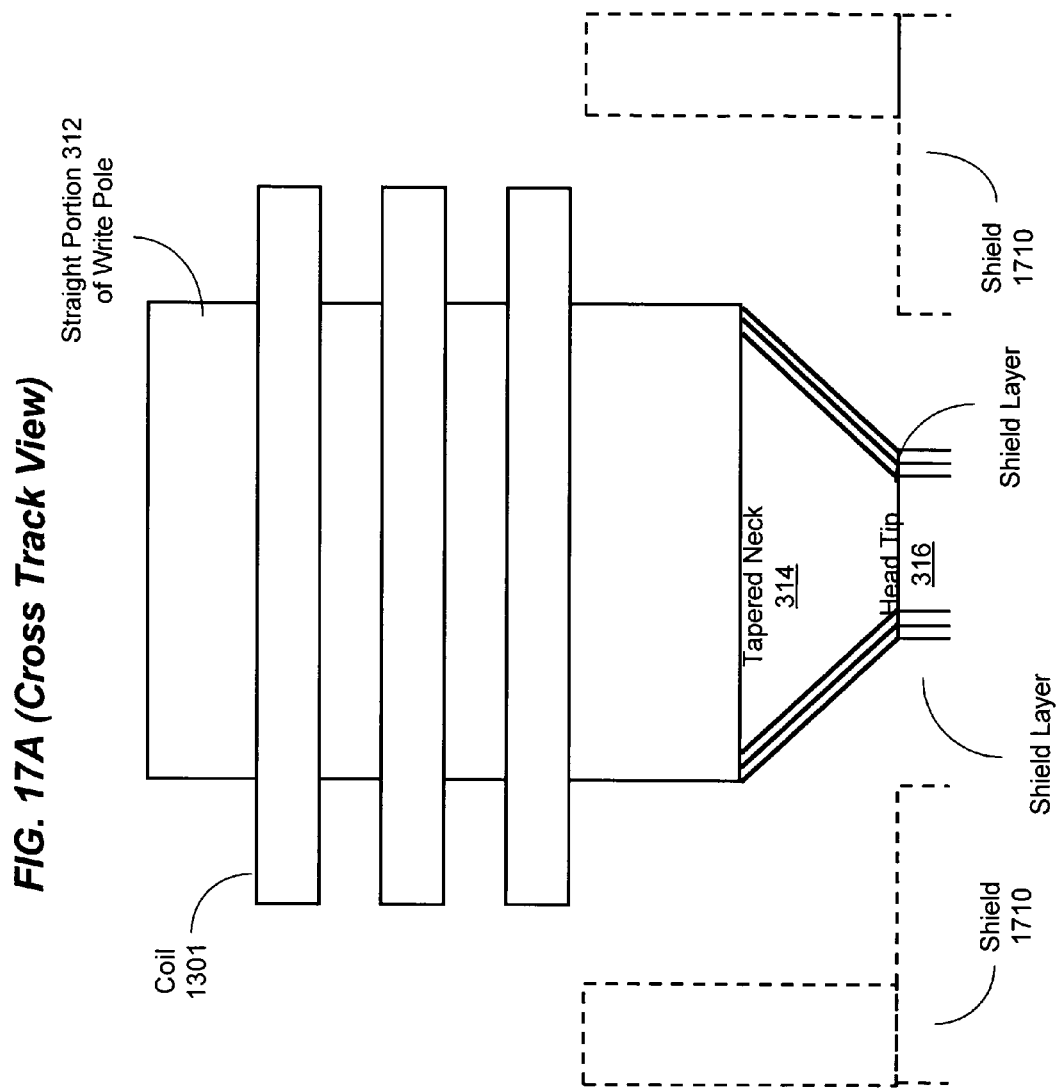
FIG. 17A (Cross Track View)

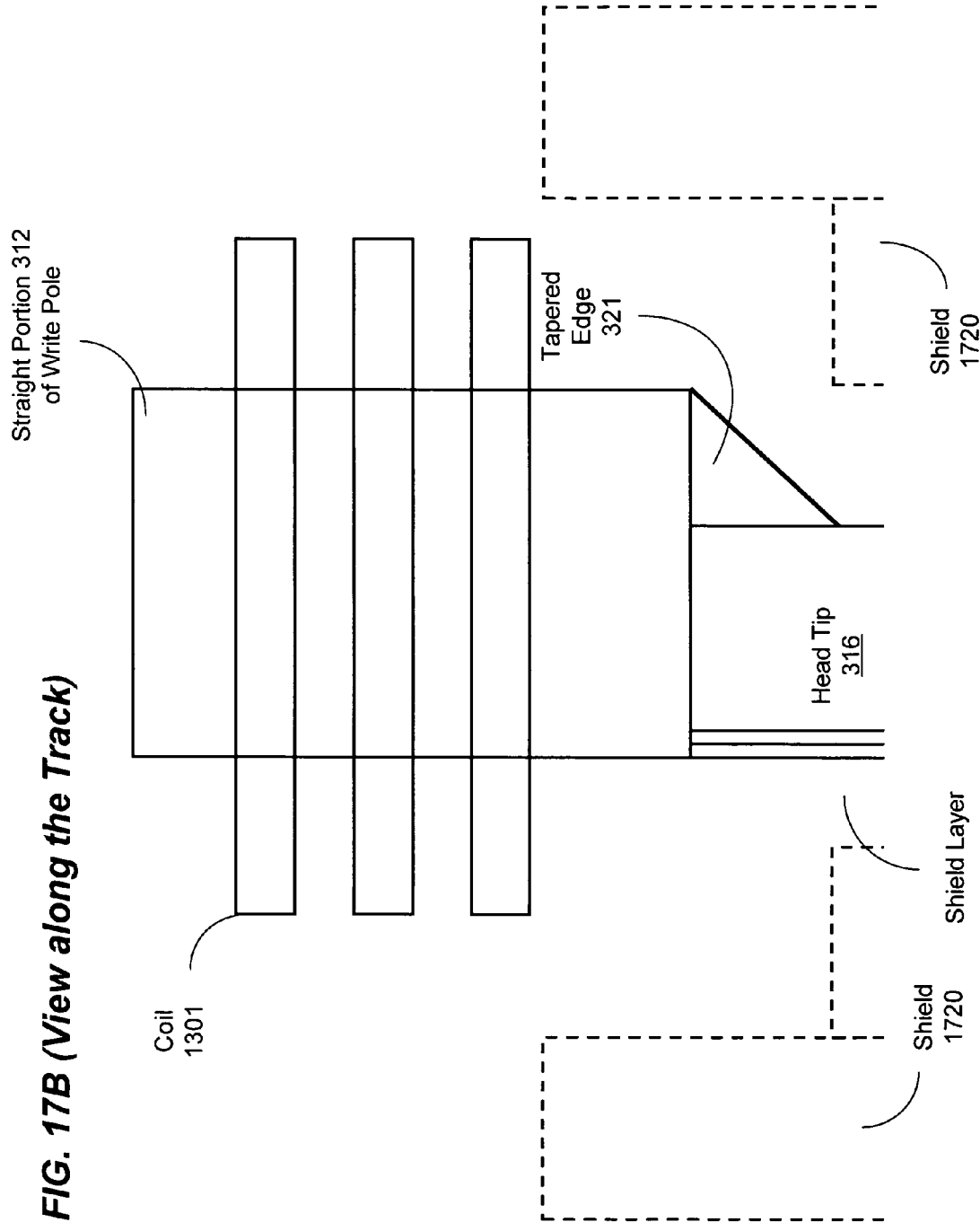
FIG. 17B (View along the Track)

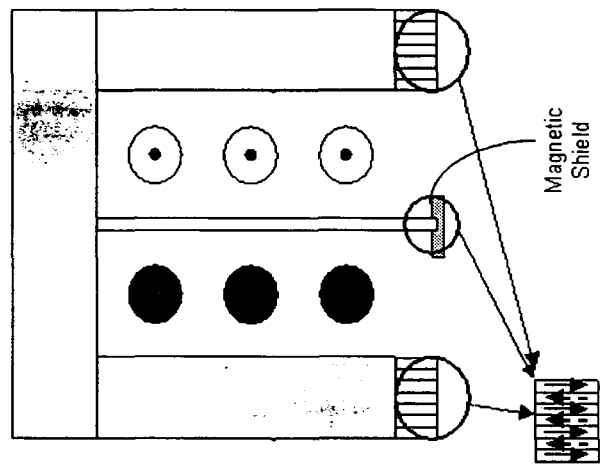
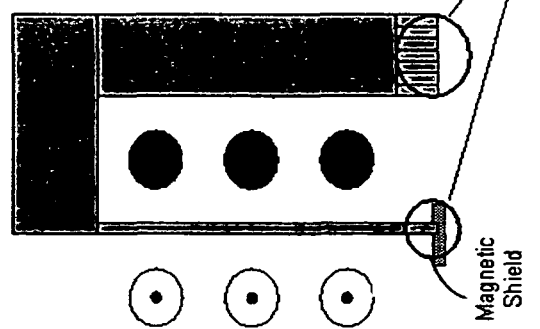
FIG. 20B
FIG. 20A

TAPERED SINGLE POLE MAGNETIC HEADS FOR PERPENDICULAR MAGNETIC RECORDING

This application claims the benefit of U.S. Provisional Patent Application No. 60/473,328 entitled "TILTED PERPENDICULAR MAGNETIC RECORDING" and filed on May 23, 2003, the entire disclosure of which is incorporated herein by reference as part of this application.

BACKGROUND

This application is related to magnetic recording techniques, devices, and systems.

Magnetic recording traditionally uses a longitudinal recording method where a recording medium is configured to have its anisotropy easy axes along the longitudinal directions within the magnetic recording medium plane. The storage density based on this method is known to be limited due to the thermal instability of the magnetic grains. An improved method based on a perpendicular recording configuration has been developed to mitigate some technical limitations in the longitudinal recording devices, e.g., to achieve better thermal stability than the longitudinal recording. Typically, a perpendicular recording configuration uses media with their medium anisotropy easy axes perpendicular to the medium plane and a single pole head with a soft magnetic under layer to enhance the write field. Another magnetic recording technique called "tilted longitudinal recording" has also been developed to use an inductive head with a tilted medium.

These recording techniques, however, have difficulties to address various limitations or barriers for further increasing the storage densities, such as the thermal stability issue, the medium noise, the bit error rate limitations, and the limited data rate due to the limited medium switching speed and other limitations. The thermal stability issue is particularly limiting in the longitudinal recording. The large media switching field distribution and transition width can lead to certain limitations in the perpendicular recording in addition to the limitation due to the media switching speed problem. In both longitudinal and perpendicular recording, the write field decreases with track width and this aspect of such methods limits the storage densities. Furthermore, the fringing field and the erase of neighboring tracks in both longitudinal and perpendicular recording are also barriers to achieving high storage densities.

SUMMARY

This application provides, among others, perpendicular magnetic recording systems that use tapered single pole write heads. Suitable magnetic recording media include tilted perpendicular recording media where the anisotropy directions of a layer of magnetic grains for recording are tilted from the direction perpendicular to the layer, and non-tilted perpendicular recording media where the anisotropy directions of a layer of magnetic grains for recording are substantially perpendicular to the layer without tilting. The tapering of the single pole write heads may be designed to produce large down-track field strength and field gradient to produce sharp transitions in writing data and to produce large off-track field gradient to avoid erasure of neighboring tracks in high density media.

In one implementation described here, a single pole magnetic head may include a tapered neck and a tip connected to the tapered neck to produce and apply a writing magnetic field substantially perpendicular to a suitable recording layer. In another implementation, a magnetic write head may include a single pole which further includes a straight portion, a tapered neck and a head tip. The straight portion extends along a direction substantially perpendicular to a recording medium. The tapered neck extends from an end of the straight portion with a tapered side profile that decreases in dimension towards the recording medium. The head tip is at an end of the tapered neck to interface with the recording medium.

An example of a tilted perpendicular magnetic recording medium is also described to include a magnetic layer and a soft magnetic under layer beneath the magnetic layer. The magnetic layer includes magnetic grains with anisotropy easy axes tilted with respect to a perpendicular direction that is perpendicular to the magnetic layer. When combined with a tapered single pole write head, such a recording medium may provide better recording performance than other recording systems, such as improved thermal stability, a higher anisotropy field $H_k$, smaller switching field distribution, reduced noise, and faster switching speed. High storage densities above $10^2$ Gbits/in$^2$, e.g., at the level of Tbits/in$^2$, can be obtained in such a tilted perpendicular recording system.

These and other implementations, examples, and associated advantages are described in detail in the drawings, the detailed description, and the claims.

BRIEF DESCRIPTION OF DRAWINGS

FIGS. 11A, 11B, 12A, 12B, 13A, 13B, 14A, and 14B illustrate examples of single pole write head designs including multi-layered structures.

FIGS. 15, 16, 17A, 17B, 18A, 18B, 19A, 19B, 20A and 20B show examples of single pole write heads with magnetic shielding.

DETAILED DESCRIPTION

The following sections first describe examples of tapered single pole write heads and titled perpendicular recording media. Next, certain limitations of longitudinal and perpendicular recording systems with conventional write heads are discussed to illustrate some of the advantages and benefits of the combinations of the tapered single pole write heads and titled perpendicular recording media. In addition, various designs of tapered single pole write heads are described. Such tapered single pole write heads may be used with various perpendicular recoding media including the tilted perpendicular recording media as illustrated in the specific examples in this application and non-tilted perpendicular recording media such as various perpendicular recording media.

Figure 1:
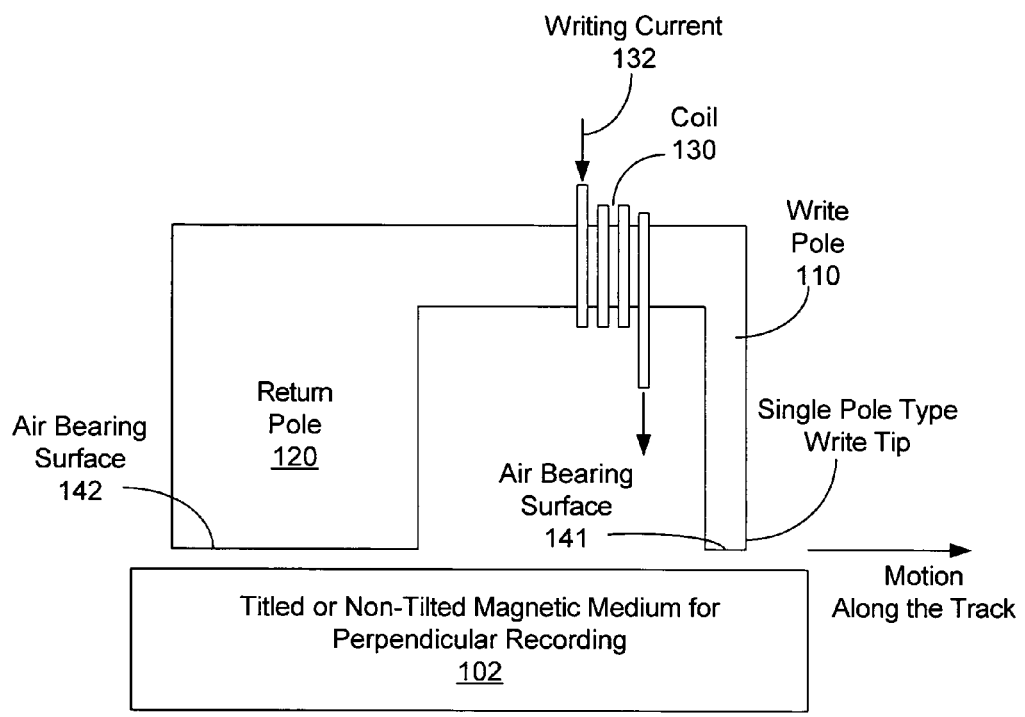
FIG. 1 illustrates an example of a single pole write head for writing on a titled or non-titled perpendicular recording medium.

FIG. 1 illustrates a magnetic write head 100 and a perpendicular recording medium 102 as part of a perpendicular magnetic recording device. The head 100 may include a magnetic material such as a ferromagnetic material (CoFe, NiFeCo, and others) shaped to form a single pole type write pole 110 and a return pole 120. A coil 130 may be engaged to a part of the magnetic material near the write pole 110 to generate a writing magnetic field at the tip of the write pole 110 under a writing electrical current 132. The coil 130 may be positioned at in a part of the magnetic material between the write pole 110 and return pole 120 as illustrated or at other positions such as in the write pole 110. The poles 110 and 120 have end facets 141 and 142, respectively, to interface with the recording medium 102 which may be a magnetic disk that spins around a disk spindle. The end facets 141 and 142 may be air bearing surfaces to float the head 100 above the top surface of the disk medium 102 during operation by an air dynamic force caused by the relative motion between the head 100 and the disk medium 102.

The disk medium 102 may have spiral or concentric tracks for storing data and may include CoCr, CoPt, FePt, and other magnetic recording materials. FIG. 1 illustrates a cross section view in a view direction perpendicular to the tracks (cross track view). The single pole write pole 110 may be an elongated pole along the direction perpendicular to the medium surface and direct a writing magnetic field to the medium 102 which are essentially perpendicular to the medium surface at or near center of the end facet 141 of the write pole 110.

The medium 102 has a structure for perpendicular recording and may be implemented as a tilted perpendicular medium or a non-tilted perpendicular medium. The medium 102 may be a disk having multiple layers formed on a substrate. As one example, the medium may include a magnetic medium layer, a growth layer beneath the magnetic medium layer, and a soft under layer beneath the growth layer. As an example of the non-tilted perpendicular recording media, the magnetic medium layer may include magnetic grains that are grown along the perpendicular direction and have their anisotropy directions in the perpendicular direction. Alternatively, the magnetic medium layer may include magnetic grains that are grown along the perpendicular direction but have their anisotropy directions tilted at a predetermined angle or angles with respect to the perpendicular direction. A tilted perpendicular medium may also be constructed to have at least one magnetic layer with perpendicular anisotropy between two magnetic exchange coupling or anti-ferromagnetic coupling layers. The magnetic interactions of these layers produce an effective tilted anisotropy of the multi-layer structure. Two or more such multi-layer structures may be stacked.

The tilted anisotropy easy axes may form an angle of from about 5 to about 85 degrees. In some implementations, the tilting of anisotropy easy axes may be between about 15 degrees and about 45 degrees with respect to the perpendicular direction. In some other implementations, the titling may be from about 30 degrees to about 45 degrees. The anisotropy easy axes may be substantially parallel with one another or may form a small cone angle, such as an angle of about 5 degrees or less from one another. Such cone angles between the anisotropy easy axes may not be random. The medium anisotropy tilted angle may be in either the down track or the cross track direction. In the examples shown below, the tilting of the anisotropy axes is in the cross track direction and is minimized in the down track direction.

Figure 2A:
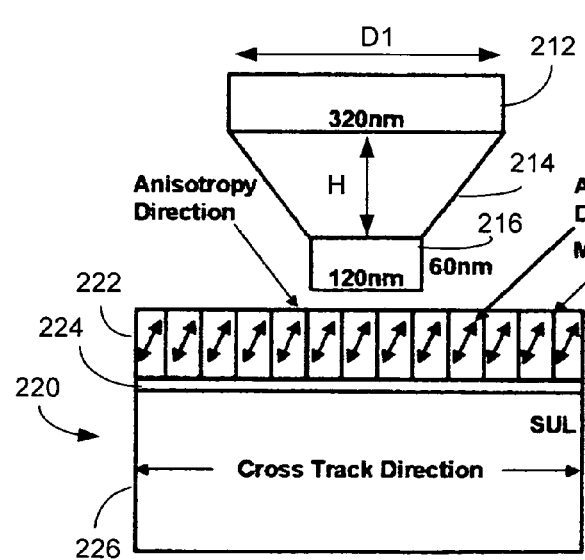
FIGS. 2A, 2B, 3A, and 3B show two examples of tapered single pole write heads and an example of titled perpendicular recording media.
Figure 2B:
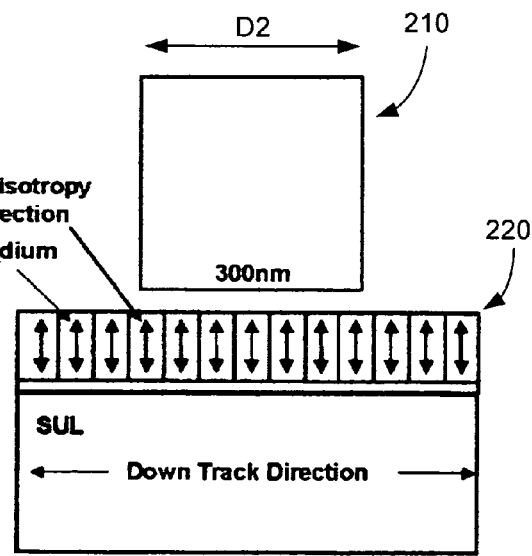

FIGS. 2A and 2B show one example of a tapered single pole write head 210 and one example of a tilted perpendicular recording medium 220 that include a recording layer 222 a soft magnetic under layer 226. Only a portion near the write tip of the write head 210 is shown. FIG. 2A shows that the tilting of the anisotropy axes of the magnetic grains in the recording layer 222 are within a plane that is perpendicular to the tracks. FIG. 2B shows that the anisotropy axes of the magnetic grains in the recording layer 222 are substantially perpendicular to the medium 220 within a plane that is parallel to the tracks. The soft under layer (SUL) 226 is used to enhance the perpendicular write field produced by the head tip on the magnetic recording layer 222. The growth layer 224 provides an intermediate layer to reduce the material mismatch between the layers 222 and 226. The dimensions marked are examples for some implementations.

Notably, in the presence of the SUL layer 226, there are two sources of write fields in the recording layer 222: the write field from the write pole and the write field from the SUL 226 by creating an image of the write pole. Simulation results suggest that, for the same $M_S$ of the write pole and the SUL, the critical thickness of the SUL is one half of the track width. In addition, the perpendicular write field decreases with the SUL permeability. However, for large permeability, the write field decreases slowly with permeability. An observable decrease in the write field occurs when the SUL permeability is less than about 50. The write field decreases substantially when the SUL permeability is below 20. Simple analysis shows the imaging field from a finite permeability SUL is $(\mu-1)/(\mu+1)$ as compared with the field from perfect imaging.

In a real recording system, the SUL properties need to be carefully chosen to maintain the maximum write field. Considered separately, the effect of SUL thickness, saturation, and permeability can be easily optimized. However, in the dynamic write process at a high data rate (e.g., about 1 Gb/s), these effects cannot be considered separately. In particular, the permeability can be significantly reduced from that of the quasi-static measurements. A good rule is to keep all the parameters sufficiently above critical values.

FIGS. 2A and 2B illustrate only the cross sections of the end portion of the write pole in the head of 210 in the cross track direction and the down track direction, respectively. In this example, the write pole of the head 210 includes a straight portion 212 that leads to the return pole of the head 210, a tapered neck 214 along the cross track direction, and a head tip 216. The straight portion 212 extends along a direction substantially perpendicular to the recording medium 220. The tapered neck 214 extends from an end of the straight portion 212 with a tapered side profile that decreases in dimension towards the head tip 216 and the recording medium 220. The head tip 216 is at an end of the tapered neck 214 to interface with the recording medium 220. The tapering is only along the cross track direction of the write pole and the write pole has a straight profile along the tracks as shown in FIG. 2B.

The tapering along the cross track direction can decrease the off-track magnetic field beyond the footprint of the head tip 216 on the medium 220 and produce a large off-track field gradient along the cross track direction. Hence, the tapering can be used to avoid erasure of the adjacent tracks during writing and produce a large write field within a track. In addition, magnetic media with high $H_k$ may be used with such tapered write heads to improve the thermal stability. Notably, the height H of the tapered neck 214 may be designed to be less than or equal to the dimension of the straight portion 212, i.e., the width D1 in the cross track direction and the width D2 along the track direction. Also, the dimensions in the cross track direction and along the track direction may be different and the dimension in the cross track direction may be less than that along the track direction.

Figure 3A:
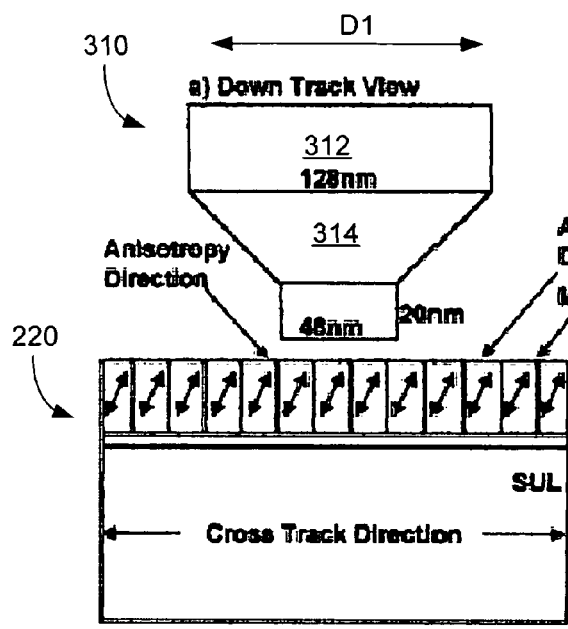
Figure 3B:
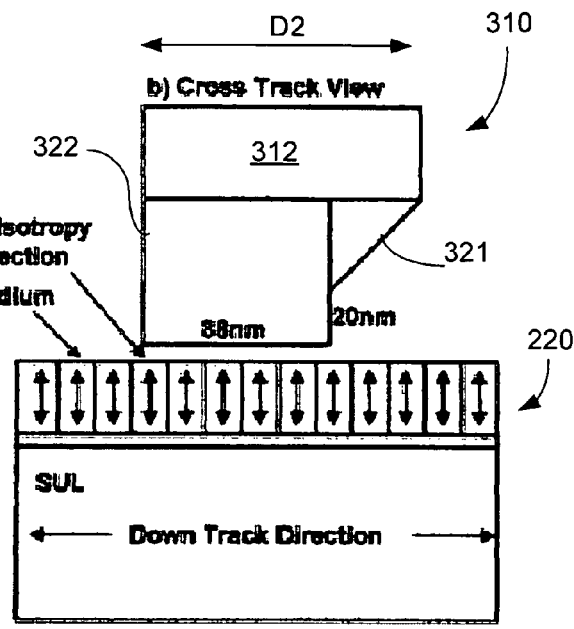

FIGS. 3A and 3B illustrate another tapered write head 310. Similar to the write head 210 in FIGS. 2A and 2B, the head 310 has a straight portion 312, a tapered neck 314, and a head tip 316 and the tapered neck 314 has tapering side profile along the cross track direction. The tapered neck 314 of the head 310 further has a tapered leading edge 321 along the track direction as shown in FIG. 3B. In comparison, the leading edge of the head 210 has a straight profile without tapering. The tapering in three side surfaces shown in FIGS. 3A and 3B further reduces the dimension of the write pole above the medium 220 and thus can further increase the write field. This three-side tapering can lessen the skew effect and the erasure of the adjacent tracks in comparison with the two-side tapered head along the cross track direction in FIGS. 2A and 2B.

As a further variation for the tapered write head designs, the tapered neck may be tapered in all directions, e.g., both sides surfaces in the cross track direction, and the trailing and leading edges along the track direction.

The present tapered write head designs and the tilted perpendicular recording media are in part based on recognition of certain technical limitations of the in longitudinal and perpendicular recording systems with conventional write heads.

The following sections describe some of these limitations and the benefits of the tapered write head 210 and a tilted medium 220 with a tilting at 45 degrees shown in FIGS. 2A and 2B. The analysis is based on micromagnetic simulation.

One of the technical limitations in various longitudinal recording media is the poor thermal stability. The governing function for the thermal stability of the medium may be given by the solution of the master equation:

$$H_{rc} = H_k s(\theta) \left[ 1 - \left( \frac{k_B T}{KV} \ln \frac{f_0 t}{\ln 2} \right)^{n(\theta)} \right]. \quad (1)$$

where K is the first order uniaxial crystalline or (and) shape anisotropy of the presumed uniformly reversing particle, V is the grain volume, $H_k = 2 K/M_s$ is the anisotropy field and $M_s$ is the saturation magnetization of the grain, $\theta$ is the applied field angle with respect to the medium anisotropy direction and $n(\theta) \sim 2/3$ for almost all $\theta$, except approaches ½ rapidly as close to 0° and 90°. $f_0$ is the thermal induced attempt frequency. When $1-(H/H_k) \ll 1$, the value of $f_0$ is approximately given by $2 \alpha \gamma H_k$. $s(\theta)$ is the Stoner Wohlfarth single particle reversal field distribution:

$$s(\theta) = \frac{1}{(\cos^{2/3}(\theta) + \sin^{2/3}(\theta))^{3/2}}. \quad (2)$$

Based on the above, the thermal stability is maintained by keeping the medium parameter of $KV/k_B T$ large enough, e.g., greater than 40. Due to the extensive cost of operation at low temperature, two methods are available to increase the medium thermal stability. One is to increase the medium anisotropy field ($H_k$); the other is to increase the volume of the medium grain. However, these two methods can be problematic in implementation.

First, in longitudinal recording, the medium anisotropy ($H_k$) may not be increased without any limit. Second, for high anisotropy field media, a proper head design is needed to provide a sufficiently large write field to write data in high medium anisotropy media. Various conventional write heads may be difficult to produce large write fields as the medium anisotropy increases. Third, for media with a high recording density, a sufficiently large write field gradient is needed to focus the write field on an extremely small area. Various conventional write heads may be difficult to achieve such tight focus.

Increasing the medium volume is a good way to enhance the thermal stability. For a fixed recording density, the number of grains per bit decreases with the increasing grain area, which decrease the signal to noise ratio (SNR) of the recording system. So the only way to increase the grain volume is to increase medium thickness. However, as the medium thickness increases to the amount much greater than the grain diameter, it becomes difficult to keep the medium anisotropy easy axes to be within the medium plane. Anti Ferromagnetic Coupling (AFC) or Synthetic Ferromagnetic Coupling (SFC) media may be used to increase the effective volume of the media, but this kind of improvement appears to produce a maximum of 50% increase in the thermal stability.

Perpendicular recording can enhance the thermal stability in comparison with longitudinal recording. As the areal density increases, the medium grains in the down track and cross track dimensions are decreased in order to maintain good signal to noise ratio (SNR). So the only way to enhance thermal stability for a given anisotropy medium is to increase the medium thickness. For a medium thickness greater than the grain diameter, the medium anisotropy directions are more likely to have perpendicular component as the thickness of the medium increases. However, there are still some intrinsic problems in perpendicular recording that cannot be easily solved satisfactorily.

For example, one of such problems is the thermal stability. As the recording densities increase, due to the constraint caused by the thermal stability, the track width decreases faster than both the down track and the perpendicular dimensions. The perpendicular recording write field decreases faster with the track width as compared to the longitudinal recording. Although the tapered neck structure with a very small throat height on the write pole may be used to increases the write field significantly, the total write field still decreases when the recording density increases.

Figure 4:
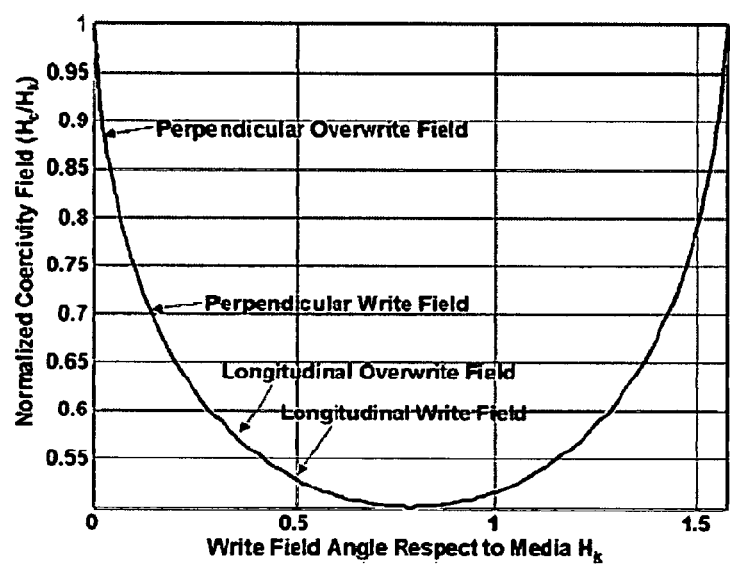
FIG. 4 shows simulation results of the angles of media coercivity fields with respect to media anisotropy in both perpendicular and longitudinal recording systems.

FIG. 4 shows media Hc under different applied field angles in the perpendicular recording. For a given $H_k$ medium, the medium switching field Hc (or closure field $H_c + 4 \pi M_s$) decreases with the increasing applied field angle with respect to the medium anisotropy direction for any angle less than $\pi/4$.

In the longitudinal recording, the medium coercivity $H_c$ is approximately in the range of between 0.5 Hk and 0.6 $H_k$ due to the perpendicular component of the write field at the tips and boundaries from the write poles. In the perpendicular recording, the medium $H_k$ is in the perpendicular direction. The largest component of write field from single pole head with SUL is also in the perpendicular direction, parallel to the medium anisotropy. As can be seen in FIG. 4, for same $H_k$ media, a larger write field is required in the perpendicular recording as compared to the longitudinal recording. By doing so, the values of $H_k$ for perpendicular media that can be written in the perpendicular recording are not much higher than the longitudinal recording.

One advantage for the perpendicular recording is that the medium thickness can be larger than that in the perpendicular recording. However, as the recording densities increase, the medium thickness of the perpendicular recording is also limited. Large thickness medium can cause the write field to decrease. This decrease is undesirable because it limits the $H_k$ of the medium that can be written on.

Figure 5:
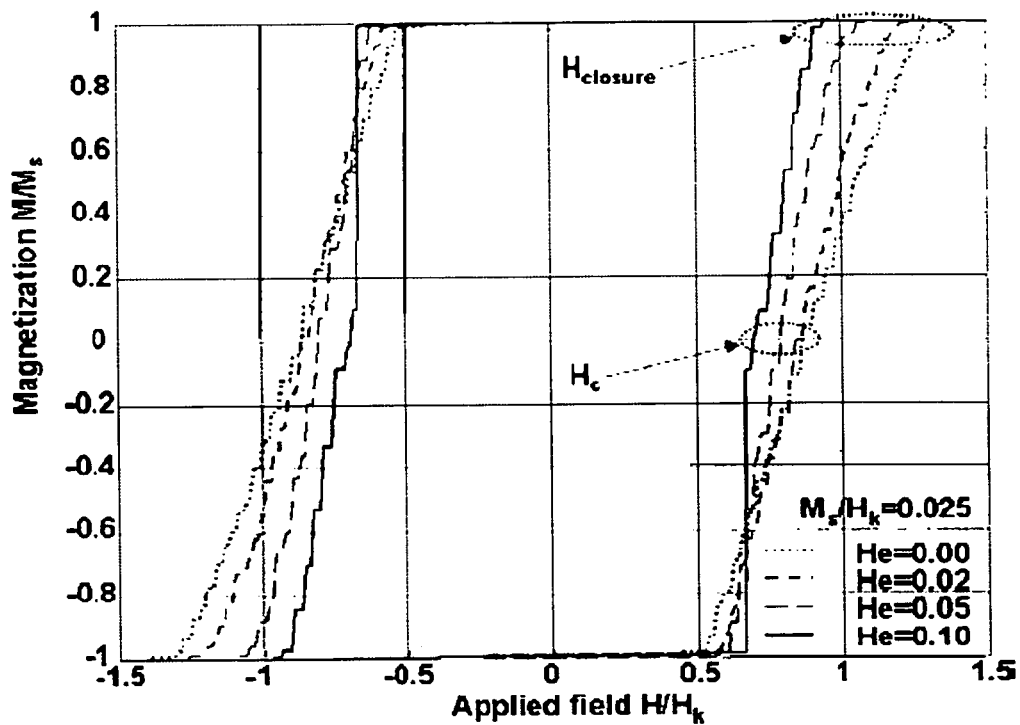
FIG. 5 shows simulation results of the a M-H loop for typical perpendicular recording media.

FIG. 5 shows typical M-H loops in perpendicular recording media without tilting. The highest $H_k$ of the media is limited by the write field from the write pole. The write field for closing the medium MH loop is about $H_c+4\pi M_s \sim 1.3 H_k$ for a medium without exchange ($h_{ex}=0.00$) and $1.1 H_k$ for small exchange medium ($h_{ex}=0.05$). Various approaches have been suggested to increase the in-plane write fields in order to lower both the medium coercivity and the switching field distribution at trailing (leading) edge. None of such approaches seems to provide a good solution for the overwrite. The poor overwrite can cause the SNR decrease significantly.

Due to at lest the above reasons, the thermal stability is a problematic in the perpendicular recording.

The prior perpendicular recording is also limited by the signal to noise ratio (SNR) due to the media switching field distribution, the small write field gradient, and effect of the magnetostatic interaction.

Figure 6:
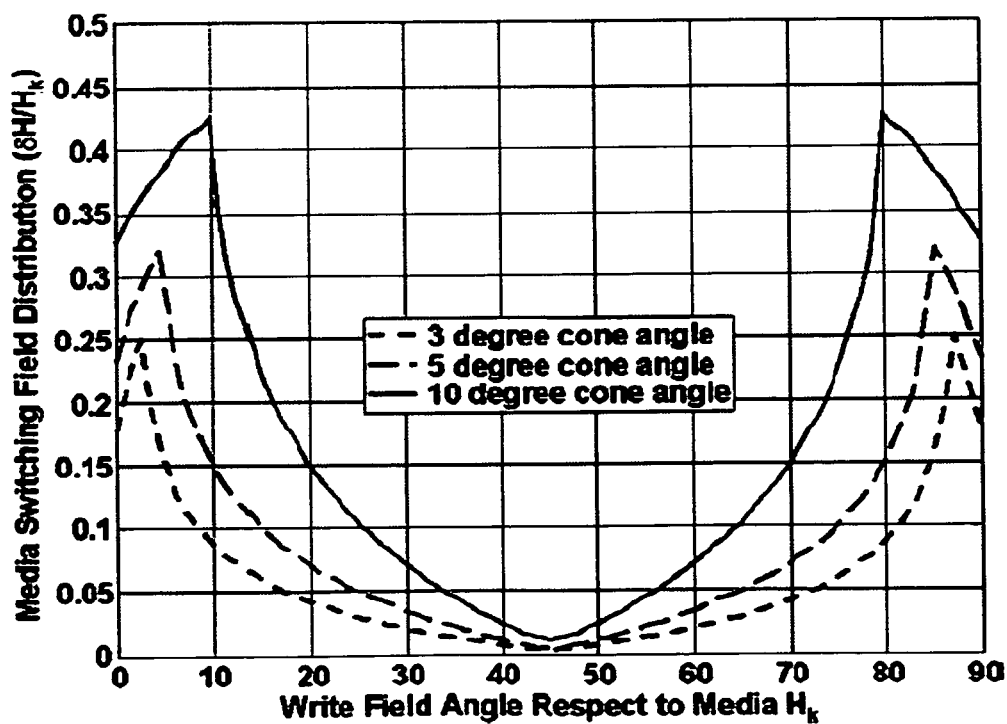
FIG. 6 shows simulation results of the media switching field distribution as a function of the write field angle distribution with respect to the media anisotropy.

FIG. 6 shows the medium switching field distribution ($\delta H/H_K$) due to the medium angle distribution. For a given $H_k$ of the medium, the medium switching field $\delta H$ changes rapidly with the angle for small angle between the applied field and $H_k$ of the medium. $\delta H$ does not change much as the angle close to $\pi/4$. In perpendicular recording, including the SUL increases the perpendicular field component and cancels the longitudinal field component. As a result, the angle between the write field and the medium anisotropy direction is small and a large media switching field distribution can be obtained. The large media switching field distribution can limit the ultimate linear recording density, and ultimately limit the areal density of the perpendicular recording.

Figure 7A:
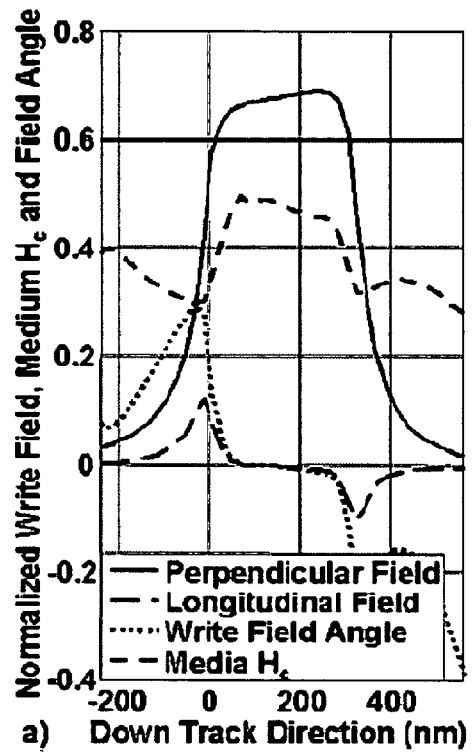
FIG. 7A shows simulation results of the spatial profiles of the perpendicular field, filed angle, and the medium coercivity relative to the field anisotropy along the center track of the perpendicular and longitudinal recording media.
Figure 7B:
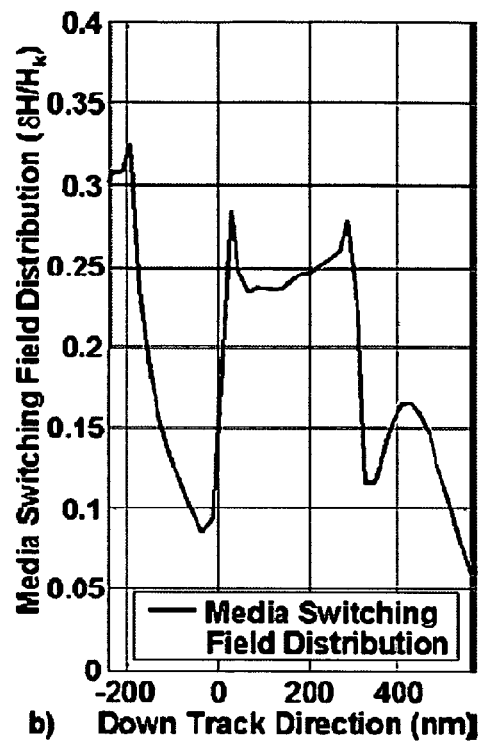
FIG. 7B shows simulation results of the medium switching field distribution along the center track for the perpendicular and longitudinal recording media.

FIG. 7A shows the typical perpendicular write field and field angle respect to the perpendicular direction along the center track. The medium anisotropy $H_k$ is assumed to be in the perpendicular direction. The medium $H_c$, due to the angle between the write field and the medium $H_k$ is also plotted in a normalized scale in terms of $H_c/2 H_k$. At the write pole boundary, where the perpendicular field is 70% of the deep gap field, the perpendicular write field gradient is large. However, in order to write on this point, the medium $H_k$ needs to be large. Due to the angle change of the write field, the $H_c$ (or $H_c+4\pi M_s$), the deep gap field cannot overwrite the medium. A good overwrite is performed when the $H_k$ is smaller. FIG. 7A suggests, as the distance from the write pole boundary increases, the medium $H_c$ decreases with the write field due to the increase in the write field angle. Therefore, the effective field gradient decreases and the transition parameter, which is proportional to the total transition width in the M-H curve, increases. FIG. 7B shows the medium switching field distribution due to the change in the write field angle along the center track. The medium switching field distribution increases significantly as the transition region moves away from the optimum point.

The magnitude of the magnetostatic interaction is represented by $M_s/H_k$. The effect of medium magnetostatic field on the transition parameter is well understood. A large $M_s/H_k$ can cause the transition parameter to increase and the SNR to decrease. Recent research shows that the bit error rate (BER) of the recording system depends closely on the medium transition parameter. In the perpendicular recording, the minimum transition parameter is limited by the grain size. Based on the current research, the linear density of the conventional perpendicular recording is less than 1000 kbpi, which is even less than the current longitudinal recording limit.

The medium switching speed depends on the initial and final magnetization states of the medium grains and their angles with respect to the applied field direction. The small angle between the applied field and the medium anisotropy direction causes the perpendicular recording medium to switch slowly as compared to the longitudinal recording. Increasing damping constant of the medium and the write field magnitude can decrease the medium switching time. However, for ultra high density recording, the write field magnitude is limited unless the medium $H_k$ is decreased. It is still unknown how to increase the damping constant of the medium. One possible way to increase the medium switching speed is to use the write field with a large angle with respect to the medium anisotropy by introducing an in-plane field component. However, this approach may lower the maximum write field from the write pole. The slow medium switching speed can also cause the transition parameter to increase and the SNR to decrease.

In addition, the fringing field from the write head in the perpendicular recording may also present a problem. Low medium Hk and large component of the stray field can cause the erasure of the neighboring tracks. Along the cross track direction, any in-plane field can increase the angle between the write field and the media anisotropy direction. Referring to FIG. 5, the energy barrier of the media grain decreases with the angle between the write field and the media anisotropy direction. As go off the track, the effective energy barrier decreases.

To mitigate the above erasure of the neighboring tracks doe to fringing field components, a high media $H_k$ may be used so that the fringing field components are not sufficient to write. However, in various conventional single pole write heads, the maximum $H_k$ that can be written is limited by the write field from the write pole and the SUL.

Due to above reasons, it is difficult for both the longitudinal recording and the perpendicular recording to exceed areal densities higher than 200 Gbit/in². One of the main limitations in these systems is the low write field produced by various conventional write heads and thus media with a high medium anisotropy cannot be used to improve the recording performance.

The tilted perpendicular recording design shown in FIGS. 2A and 2B can be used to produce large write fields and thus provide improved recording performance than conventional longitudinal recording and perpendicular recording. In order to enhance the write field magnitude, the write pole tip is designed to have a tapered neck structure with a very small throat height. The medium is designed to have the anisotropy easy axes tilted at a desired angle, e.g., 30° or 45°, with respect to the perpendicular direction. The medium easy axes may be parallel to one another with a small cone angle of, for example, 5° or less.

The medium anisotropy tilted angle can be in either the down track or the cross track direction, depending on the reader and the channel characteristics. A large medium tilted angle, e.g., from 15 to −45 degrees, may be expected in some applications in order to achieve desired recording performance. For practical recording systems, the optimized design may depend on the medium material properties, the recording geometry and the recording head design. The optimum design for the tilted perpendicular recording system including both the head and the medium with SUL. The analysis of the system in FIGS. 2A and 2B is for a medium tilted with an angle of 45 degrees respect to the perpendicular direction.

Figure 8:
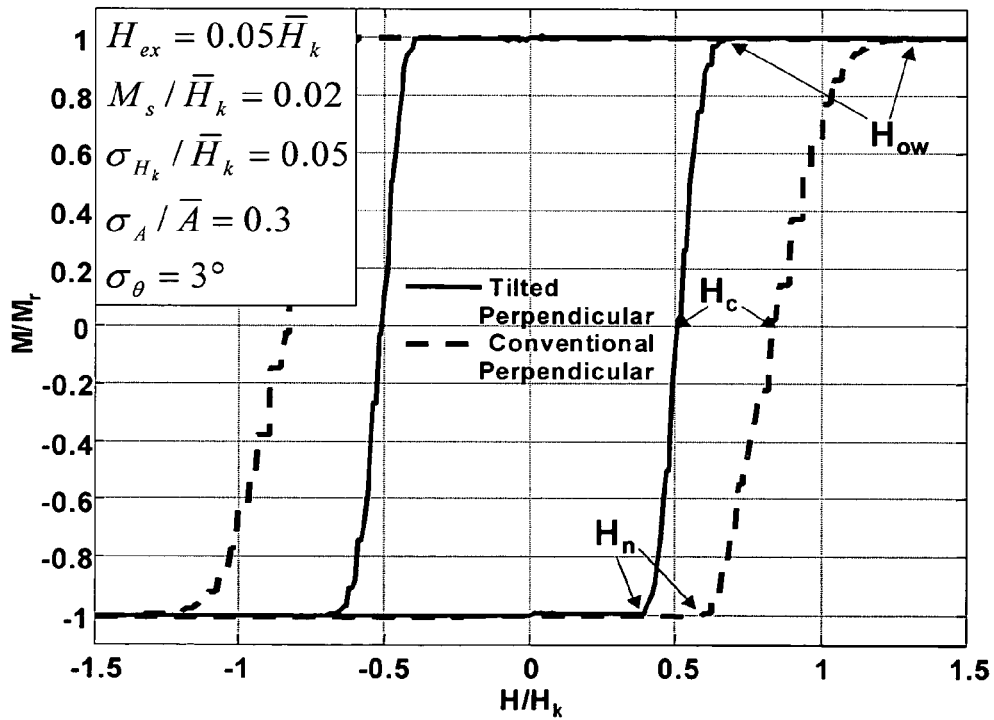
FIG. 8 shows simulation results of the remanent M-H loops for the titled perpendicular media and conventional perpendicular media where the cone angle distribution for the anisotropy axes is within 3 degrees.

FIG. 8 shows the micromagnetic simulation results for both the tilted medium shown in FIGS. 2A and 2B and a perpendicular medium without tilting. Both the media include an $H_k$ angle distribution with a 3° cone angle. The overwrite field ($H_{ow}$) is assumed to be in the perpendicular direction. The simulation shows that for the tilted medium, both the Hc and the field for closing the MH loop is significantly smaller than that of the perpendicular medium (Hc: 0.5 $H_k$ vs. 0.8 $H_k$, $H_{closure}$: 0.65 $H_k$ vs. 1.35 $H_k$). This results suggest utilizing the tilted medium, the recording medium $H_k$ can be much larger (almost doubled) as compared with the current perpendicular recording, which is significantly larger than the longitudinal recording too.

FIG. 8 also shows that the nucleation field of the tilted medium, defined as the negative field with the first medium grain reversed, is also much larger (than that of the perpendicular medium. The absolute value of Hn for tilted perpendicular media is smaller than that for the perpendicular media, the ratio of ABS(Hn/How) for tilted perpendicular recording media is much larger than that for conventional perpendicular recording media. Based on the data in FIG. 8, in the illustrated tilted perpendicular recording medium, this ratio is about (0.4/0.65)=0.61 while the ratio for the conventional perpendicular recording medium is about (0.6/1.35)=0.44. This implies less medium noise and larger thermal stability in both the high density and the low density recording.

Figure 9:
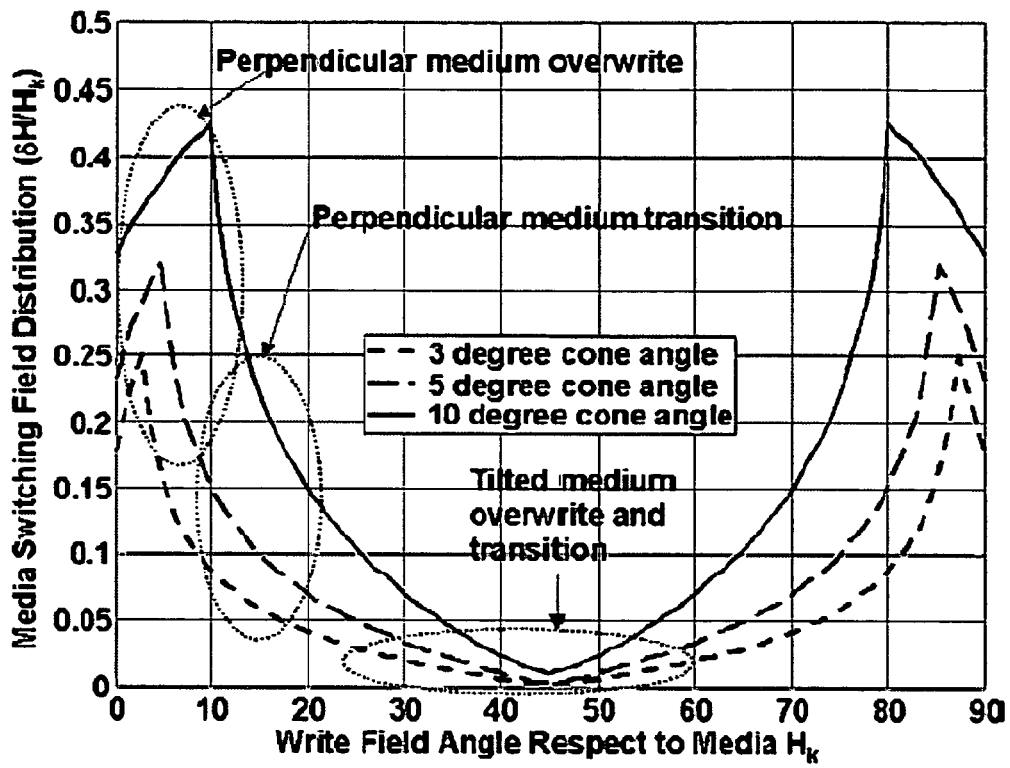
FIG. 9 shows simulation results of the switching field distribution with respect to the write field angle for the titled perpendicular media and conventional perpendicular media.

FIG. 9 shows the medium switching field distribution (due to the $H_k$ angle distribution) for both the tilted medium and the perpendicular medium. The switching field distribution is obtained from Equation (2). Utilizing the single pole head having the tapered neck structure with a very small throat height, the recording field at the transition center has 15° of the in-plane field component. For the medium without the intergranular exchange, the results show that the medium switching field distribution, at both transition boundary and below the write pole where the medium is overwritten, are much smaller in the tilted medium as compared with that in the perpendicular medium. For example, at a titled angle of 5°, the ratio $\delta H/H_k$ is about 0.03 in the tilted media and is about 0.10 in the conventional perpendicular medium at the transition boundary. For the overwrite, the ratios for $\delta H/H_k$ are about 0.03 and 0.30 for the titled media and the conventional perpendicular media, respectively. The small switching field distribution helps to decrease the transition parameter, which is critical for both the SNR and the BER in ultra high density recording.

In reality, both the $H_k$ angle and magnitude have distributions. Consequently, the medium switching field distribution is larger than what is shown in FIG. 9. A detailed study shows that including all the $H_k$ distributions, the tilted medium, utilizing single pole head with SUL, still has smaller medium switching field distribution as compared to both the longitudinal and the perpendicular recording.

Turning to the effect of the magnetostatic interactions, it is known that a large magnetostatic field ($M_s/H_k$) in the medium (self demag) increases the transition parameter and decreases the SNR. To decrease the effect of the magnetostatic interactions, the saturation magnetization ($M_s$) of the medium is lowered. However, the $M_s$ of the medium cannot be too small in order to obtain enough signal. Referring to FIG. 8, a larger $H_k$ of the medium can be written on the tilted medium for a given recording field implies a smaller $M_s/H_k$ ratio can be utilized, which helps to lower the effect of the magnetostatic interactions and to decrease the overall transition parameters.

A single pole head with the SUL and the tapered neck with a small throat height can achieve large perpendicular recording field with large field gradient. In the perpendicular recording, the medium coercivity decreases with the write field. The effective write field gradient is small. In the present tilted perpendicular recording, the recording system can be optimized with respect to the medium tilted angle so that the direction of the optimum recording field at the transition center can be close to 45° with respect to the perpendicular direction. Therefore, close to the transition center where the largest perpendicular field gradient occurs, the medium coercivity increases with decreasing write field. Under these conditions, a large effective field gradient is produced and thus the medium transition parameter can be reduced.

Figure 10:
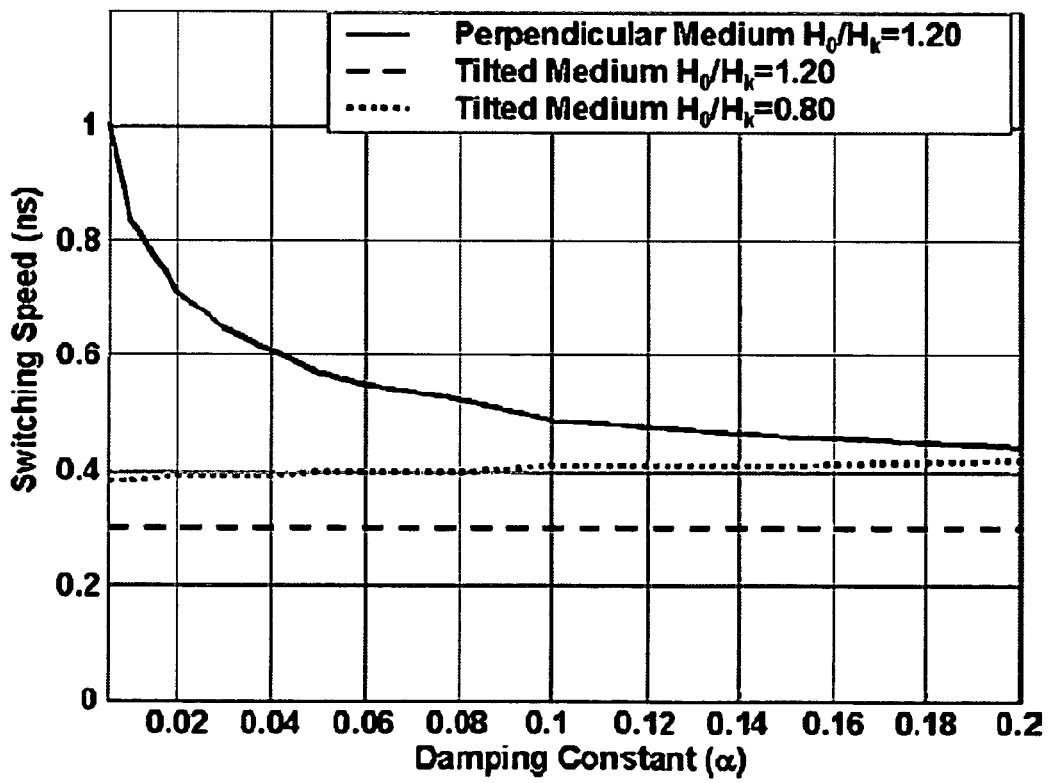
FIG. 10 shows simulation results of the switching speed as a function of the damping constant for both the titled perpendicular media and conventional perpendicular media.

FIG. 10 shows the medium switching speeds as a function of the damping constant for the tilted perpendicular recording and the perpendicular recording. The irreversible switching time is defined by Benakli et al. in "Micromangetic study of switching speed in perpendicular recording media," IEEE Tran. Magn., Vol. 37 (no. 4, pt. 1), pages 1564-1566 (July 2001). The recording field is assumed to be in the perpendicular direction. An applied reversal field can be represented by $$H(t)=H_0(1-2e^{-t/\tau}) \text{ where } \tau=0.2 \text{ ns.}$$

The data shows that the field magnitude $H_0$ is 1.2 $H_k$ for the perpendicular recording and are 1.2 Hk and 0.8 $H_k$ for the tilted perpendicular recording. As an example, an overwrite field of 0.8 $H_K$ is used to write media in the titled perpendicular configuration while an overwrite field of 1.2 $H_K$ is used to write. Hence, for the same overwrite field, for example, 1T, higher $H_K$ media may be used in the titled configuration than the conventional perpendicular configuration. This reflects a 50% gain in the magnitude of the medium $H_k$ (e.g., 1T=10000 Oe, 10000/0.8=12500 Oe vs. 10000/1.2=8333 Oe). The medium $M_s/H_k$=0.025; the simulation including grain size distribution with $\sigma_A/A$~0.38 and $\sigma_{HK}/H_k$~0.05 (both the grain size distribution and the $H_k$ magnitude distribution is assumed to be in log-normal distribution). The results show that for different damping constants, the tilted perpendicular medium switching speed is much faster than the perpendicular medium. Note that the applied field rise time is approximately 0.4 ns here. The perpendicular medium switching time decreases with the increasing damping constant, while for the tilted medium, the switching speed is almost independent with the damping constant, which implies a medium switching speed limit is reached.

Referring back to FIG. 8, the medium $H_k(H_n)$ in the tilted perpendicular recording system is significantly larger than the medium $H_k(H_n)$ in the perpendicular recording. In the cross track direction, any in-plane field changes the angle between the write field and the medium anisotropy direction away from 45°. As shown in FIG. 4, the energy barrier of the medium grains increase with this angle. As go off track, the energy barrier increases. Both the $H_k$ increases and the angle changes in the tilted perpendicular recording increase the energy barrier of the medium grains in the neighboring tracks. As a result, the adverse effect of the fringing field from the write head is reduced in the tilted perpendicular recording.

The above analysis of both the tilted perpendicular recording and the perpendicular recording based on micromagnetic simulations suggests that, the tilted perpendicular recording system can significantly increase the medium thermal stability as compared to both the longitudinal and the perpendicular recording. For example, a possible gain in stability from 50% to about 100% may be achieved over the perpendicular recording. A feasible smaller transition parameter and a larger SNR can be achieved in the tilted perpendicular recording than the perpendicular recording. An almost instantaneous switching in the tilted medium is obtained in the tilted perpendicular recording. This switching may be used to achieve a data rate above 2 GHz. The tilted recording system has much less fringing problem as compared to both the longitudinal and the perpendicular recording.

The above tilted perpendicular recording may be used to achieve a high write field from write head to write highest anisotropy magnetic media. The media $H_k$ may be increased by a factor of about 1.6 with this method. The neighboring tracks becomes more stable as the Hk of the media increases. A larger write field, almost 50-80% higher than the highest write field in other systems, may be used in the present system. This high $H_k$ can be used to significantly solve thermal stability problem. For example, if the current grain sizes in other magnetic media are used, the tilted recording media may have an extreme long data decay time and can be practically used to store written data indefinitely. The media switching field distribution can be decreased by 80%. The switching speed, which may be at least 5 times faster than that in the perpendicular recording, is comparable with longitudinal recording. The tilted perpendicular recording allows for a large write field, almost 50-80% higher than the highest write field in other systems. For example, the write field can be close to the saturation field Bs by introducing the tapered neck structure with very small throat height for single pole tip (SPT) with SUL. The tilted perpendicular recording significantly reduces the media switching field distribution so that a sharp transition can be achieved with a small transition width. This leads to a higher storage linear density. The tilted perpendicular recording also increases the media energy barrier at the track edge and the neighboring tracks as compared to conventional perpendicular recording. This allows for a reduction in the erase band by 50% or more in comparison with other recording methods. Notably, a storage density at or above 1 Tera bit/in$^2$ may be achieved in systems under this tilted perpendicular recording configuration. The tilted perpendicular recording may be suitable for various recording applications such as hard disk recording, pattern media, thermal assistant (pattern) media and other magnetic recording applications.

In the above examples of the tilted perpendicular recording, tapered single pole write heads are used to produce large down-track field and field gradient and to generate a large off-track field gradient. In addition, the tapering effectively reduces the footprint of the write pole on the recording media and thus allows for higher data densities. These and other desirable properties of the tapered single pole write heads may be used to improve performance of other perpendicular recording media such as non-tilted perpendicular recording media where the anisotropy axes of the magnetic grains are substantially perpendicular to the media surface.

The tapering of a single pole write head is used to control the spatial profiles and magnitudes of the write field and the fringing field. FIGS. 2A, 2B, 3A, and 3B illustrate examples of possible tapering configurations. In these designs, the height H of the tapered neck may be less than or equal to the dimension of the straight portion. Analytical results with perfect saturation show that the maximum field is the product of the Ms and the total solid angle from the air bearing surface (ABS) of the write pole to the media plus imaging. As recording densities increase, both the track width and the write pole thickness decrease faster than the medium thickness. Therefore, the total solid angle from the ABS to the medium decreases as the track width decreases. However, for the tapered-neck pole, the saturation area in the write pole can be increased by increasing the driving current. As the driving current increases, the saturation position of the tapered-neck pole moves away from the ABS. Additional surface charges occur along the side of the neck region, close to the write tip. These charges increase the write field logarithmically with distance. The solid angle from those additional charges overlap each other for any on-track position. For any off-track position, the overlap of the solid angle from the sides of the tapered neck disappears, reducing the field away from the track edge.

In addition, the surface charges on the tapered write pole repel one another and push some of the charges from both sides of the write pole back to the ABS. Therefore, an equivalently larger write pole density in the ABS can be achieved, which increases both the write field and the field gradient. This effect can be doubled when the SUL is present in the tilted medium due to the magnetic imaging. Thus, for this kind of tapered-neck pole with a very small throat height, a significant increase of the write field and field gradient is achievable. However, the cross-track field gradient may decrease if the tapered-neck saturation width is too large. Computer simulation indicates that for a total saturation width less than 2.5 times the track width, the normalized write field gradient in the cross-track direction does not decrease significantly. For the tapered-neck pole, the saturation width can be easily controlled by a small change of the writing current.

In the above tapered single pole write heads, the write field may still be present in form of a remanent write field when the writing current is turned off. This remanent write field is produced by the remanent magnetization if the magnetic material that forms the single pole head and is undesirable because it may erase or overwrite data. To minimize such undesired remanent magnetization in the single pole write head, the magnetic material for the write pole and the return pole may include a multi-layer magnetic material where different layers have equilibrium magnetizations that are substantially opposite to one another. For example, for each magnetic layer with an equilibrium magnetization, another different magnetic layer with an opposite or nearly opposite equilibrium magnetization is provided to substantially minimize the net remanent magnetization when the driving current in the coil is tuned off.

FIGS. 11A and 11B show two exemplary single pole write heads that include such a multi-layer structure. FIG. 11A shows a single pole write head with a write pole 1110 and a single return pole 1120. A coil 1101 is shown to locate in the magnetic material connecting the write pole 1110 and the return pole 1120 in a pancake coil design. Both the write pole 1110 and the return pole 1120 include a multi-layer magnetic material where different layers have equilibrium magnetizations that are substantially opposite to one another. The multi-layer magnetic material includes equal numbers of the first magnetic material layers 1131 with their equilibrium magnetization along the first direction and the second magnetic material layers 1132 with their equilibrium magnetization along a second direction that is substantially opposite to the first direction. FIG. 11B shows a single pole write head with a write pole 1110 and two return poles 1120 and 1121. Similar to FIG. 11A, each pole includes equal numbers of the first magnetic material layers 1131 and the second magnetic material layers 1132. Two coils 1101 and 1102 may be used to enhance the write field at the write pole 1110.

FIGS. 12A and 12B show two exemplary single pole write heads that include such a multi-layer structure in a different configuration. FIG. 12A shows a single pole write head with a write pole 1210 and a single return pole 1220. Different from the designs in FIGS. 11A and 11B, only an end portion of both the write pole 1210 and the return pole 1220 includes a multi-layer magnetic material where different layers 1231 and 1232 have equilibrium magnetizations that are substantially opposite to one another. FIG. 12B shows a single pole write head with a write pole 1210 and two return poles 1220 and 1221.

FIGS. 13A and 13B show the write heads in FIGS. 11A and 11B with a helical coil configuration. A helical coil 1301 is formed around the write pole 1110 to be close to the head tip that interfaces with the recording media. FIGS. 14A and 14B the write heads in FIGS. 12A and 12B with a coil 1301 around the write pole 1210 to be close to the head tip.

As described above, one of the aspects of the tapering of a single pole write head is to spatially confine the write field to the area under the head tip and to reduce the fringing field in an adjacent track. Independent of such tapering, the single pole write head may be magnetically shielded with a magnetic shield element to control the spatial profiles of the write field and the fringing field. A shield material may be CoFe and other suitable magnetic materials. Several examples of magnetic shielding configurations are described below.

Figure 15:
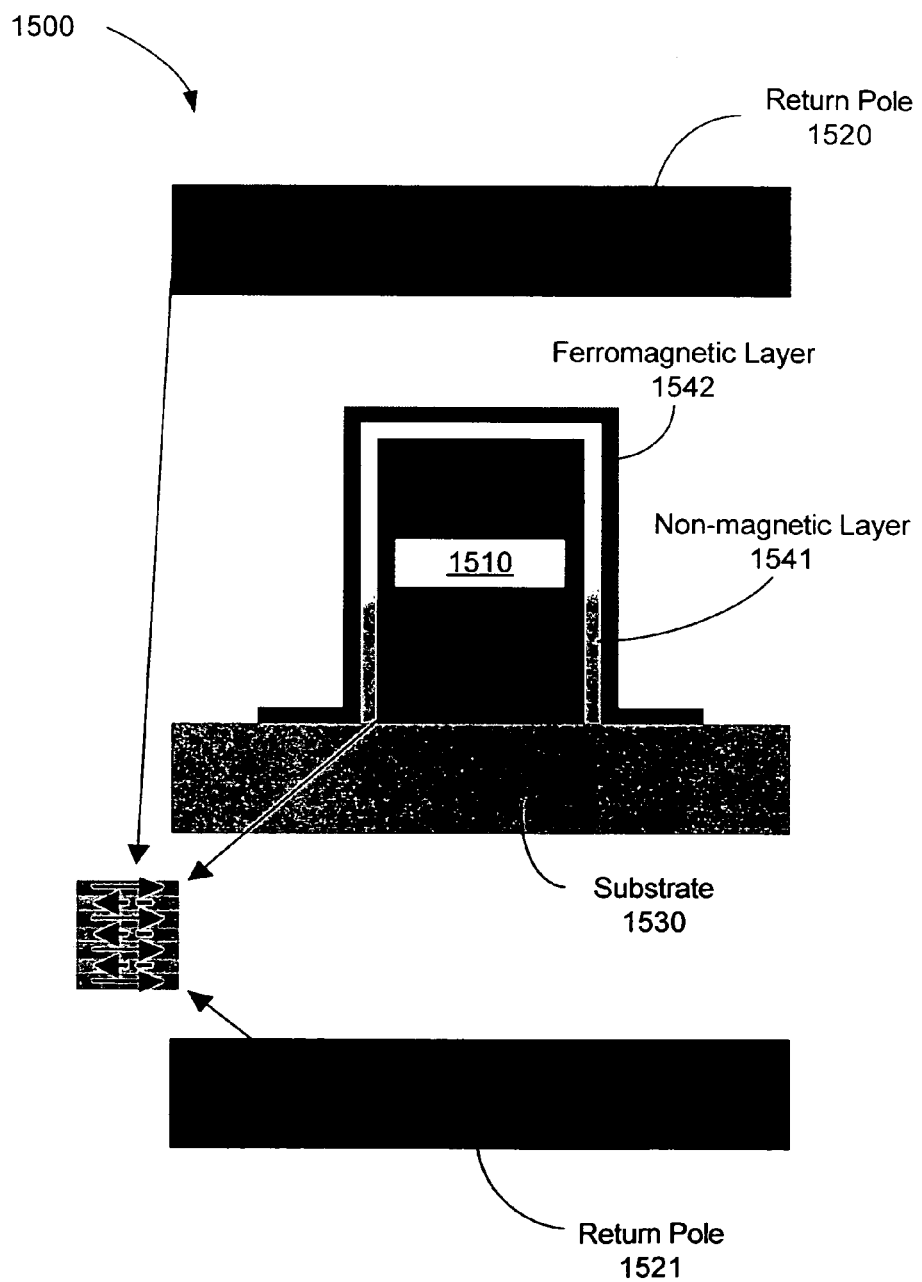

FIG. 15 illustrates an example of a single pole write head 1500 having a magnetic shielding element direction formed on the write pole. In this example, the head 1500 includes a write pole 1510 formed on a substrate 1530 and two return poles 1520 and 1521 similar to the head designs in FIGS. 11B and 12B. Each pole may be formed of a ferromagnetic material and may include a multi-layer magnetic material with opposite equilibrium magnetizations as described in FIGS. 11A, 11B, 12A, and 12B. FIG. 15 shows a cross section view looking from the bottom the air bearing surface. The shielding element includes a non-magnetic layer 1541 formed over side surfaces of the single pole 1510 and a ferromagnetic layer 1542 formed on the non-magnetic layer 1541. The non-magnetic layer 1541 operates as an isolation layer to separate the single pole 1510 and the ferromagnetic layer 1542 from contacting each other. Additional layers of non-magnetic and ferromagnetic layers may be added as part of the shielding element.

As illustrated in FIG. 15, this shielding element is formed on three side surfaces of the single pole 1510 due to presence of the substrate 1520. In absence of the substrate 1530, the shielding element may be formed on all four side surfaces. Alternatively, an anti-ferromagnetic coupling layer (such as Ru) or a magnetic exchange decoupling layer (such as Al) may be formed over side surfaces of the single pole 1510 to provide shielding. Such shielding elements may also be used with other heads described in this application.

Figure 16:
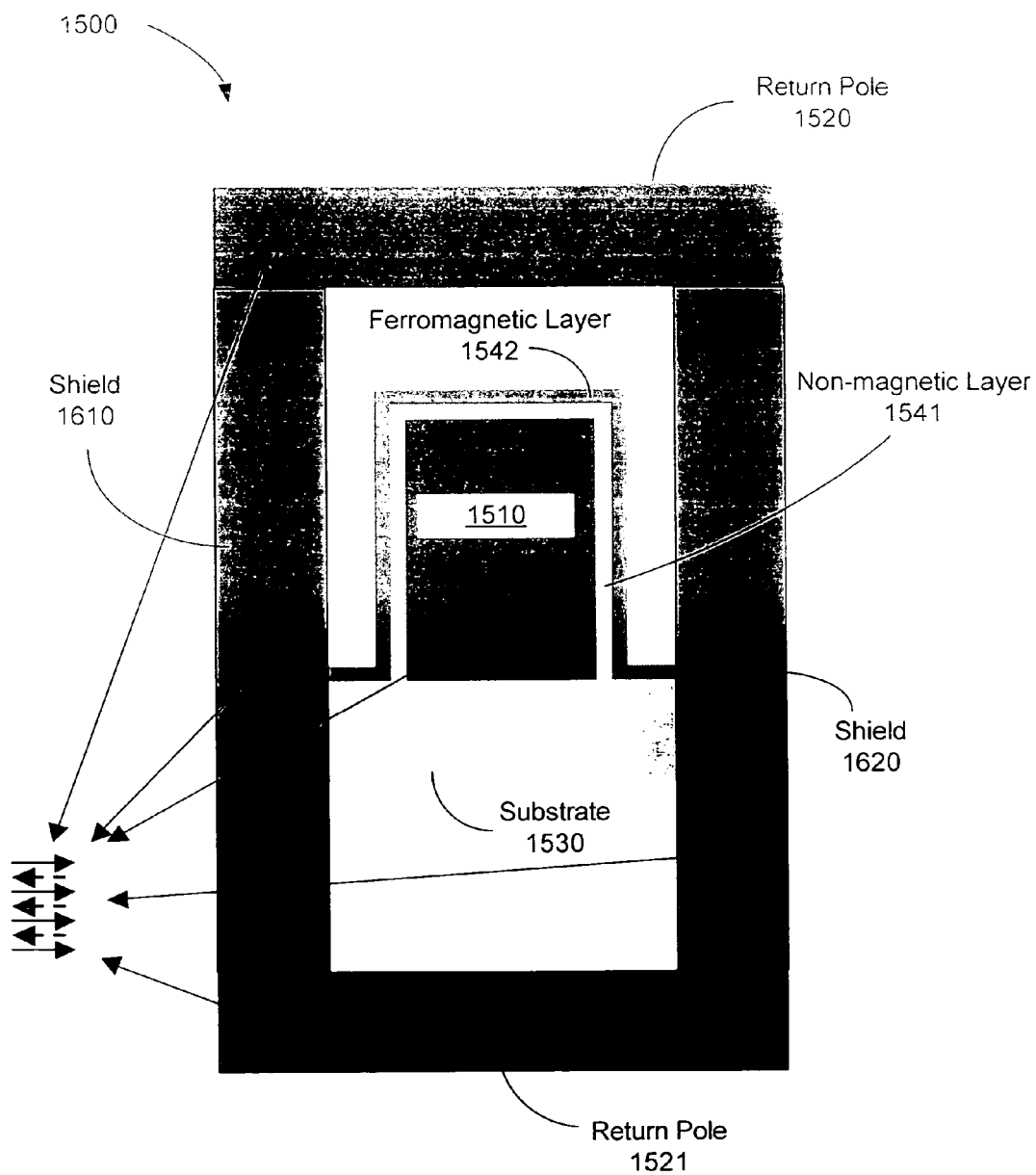

FIG. 16 shows anther magnetic shielding design for the write head shown in FIG. 15 where magnetic return shields 1610 and 1620 are added. The shields 1610 and 1620 may be in contact with the ferromagnetic layer 1542 and the return poles 1520 and 1521 to form a closed shielding around the write pole 1510 as illustrated. In this configuration, the shields 1610 and 1620 are part of the magnetic flux path of the head. Alternatively, the shields 1610 and 1620 may be separated from the ferromagnetic layer 1542 and the return poles 1520 and 1521 and thus are not part of the magnetic flux path.

FIGS. 17A and 17B show separate magnetic shields 1710 and 1720 for a single pole write head based on the head design in FIGS. 3A and 3B. The shields 1710 and 1720 are separate from the write pole and return pole to be out of the magnetic flux path. Alternatively, the shields 1710 and 1720 may be connected to either or both of the return pole and the write pole. In addition, FIGS. 17A and 17B further show certain side surfaces of the tapered write pole are coated with a magnetic shielding layer which may be a multi-layer shielding shown in FIG. 15, an anti-ferromagnetic coupling layer or a magnetic exchange decoupling layer.

Figures 18A, 18B:
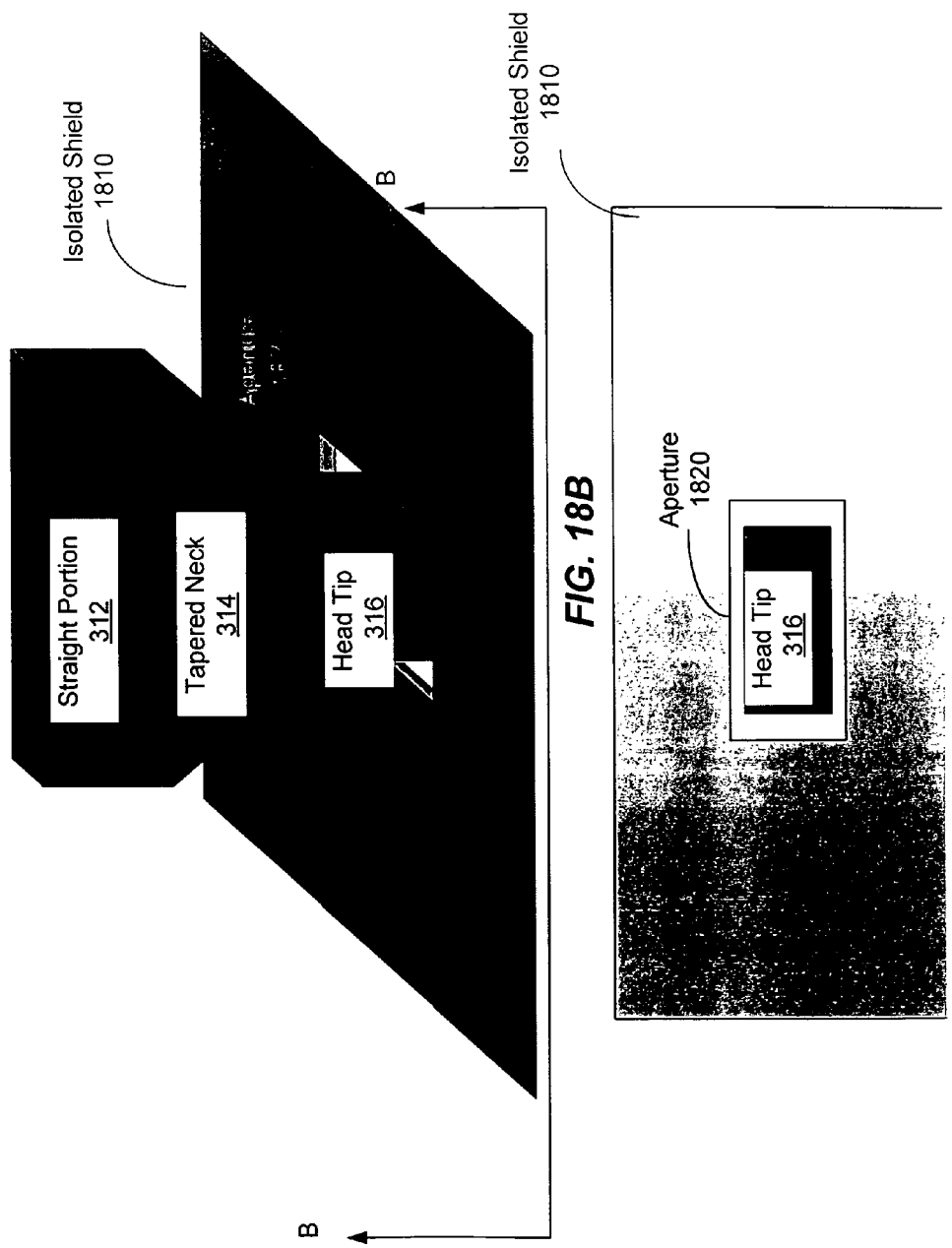

FIGS. 18A and 18B illustrate yet another magnetic shielding design for a tapered single pole write head. A soft magnetic plate or a soft magnetic layer formed on a substrate 1810 with an aperture 1820 is provided as a magnetic shield. The shield 1810 may be positioned to be parallel to the recording medium and to receive the head tip 316 in the aperture 1820. In this example, the shield 1810 is isolated from the return magnetic pole and the single pole magnetic head.

Figure 19A:
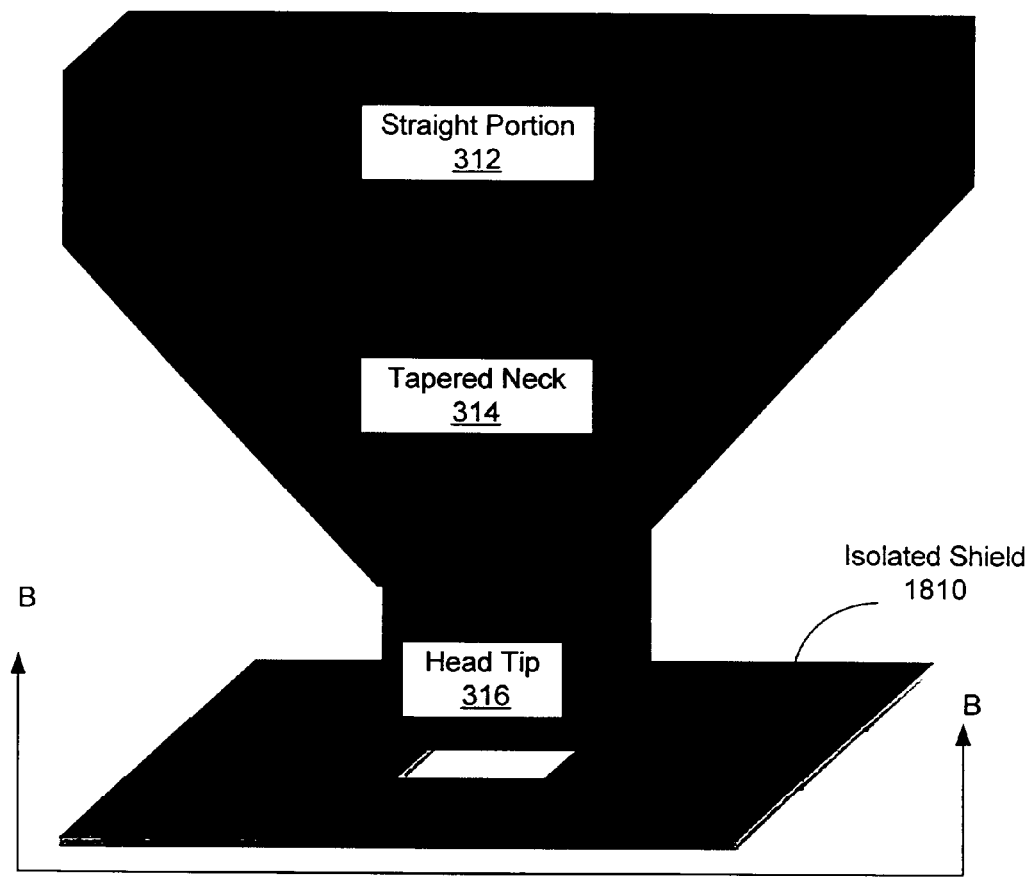
Figure 19B:
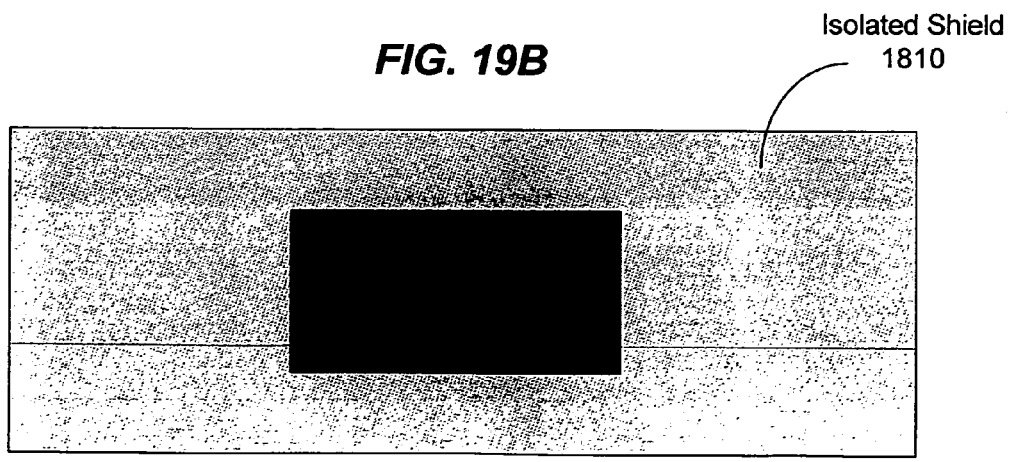

Alternatively, the aperture 1820 may be smaller than the head tip 316 as shown in FIGS. 19A and 19B so that the shield 1810 is placed under the head tip 316. The dimension and geometry of the aperture 1820 may be designed to effectuate the desired shielding and to control the spatial profile of the write field and the fringing field.

Only a few implementations are disclosed. However, it is understood that variations and enhancements may be made. For example, the above head design features, including the multi-layer magnetic material with opposite equilibrium magnetization and various magnetic shielding designs, may be applicable to both tapered single pole write heads and other single pole write heads. As another example, the tapered single pole write heads may be used to write on perpendicular recording media without the tilted anisotropy. The shied elements may be either connected to the return pole as part of the magnetic flux path or be isolated from a return pole to be out of the magnetic flux path. Various features may be combined in different combinations. For example, FIGS. 20A and 20B show two examples of single pole write heads in FIGS. 14A and 14B that implement a shield at the write tip. Other variations are also possible.

What is claimed is:

1. A perpendicular magnetic recording head, comprising:
a one-piece body forming a single-pole write tip and a return pole, a first end of the return pole and a first end of the single-pole magnetic write tip structured as part of a contiguous section of the body to guide magnetic flux associated with operation of the magnetic recording head, a second end of the single-pole magnetic write tip and a second end of the return pole being separated from one another by a gap, the single-pole magnetic write tip comprising a straight portion extending along a direction substantially perpendicular to a recording medium, a tapered neck forming the second end of the single-pole magnetic write tip and extending from an end of the straight portion with at least two tapered side profiles decreasing in dimension toward the recording medium, and a non-tapered head tip section at an end of the tapered neck to interface with the recording medium, wherein the at least two tapered side profiles of the tapered neck comprises two tapering side profiles along a cross track direction of the recording medium; and
a coil engaged to a part of the body to generate a magnetic field in the body which is shaped by the tapered neck forming the second end of the single-pole magnetic write tip with the at least two tapered side profiles to generate a writing magnetic field at the non-tapered head tip section of the single-pole magnetic write tip so as to change a magnetization of a portion of the magnetic medium near the non-tapered head tip section of the single-pole magnetic write head.

2. The magnetic recording head as in claim 1, wherein the tapered neck has a length between the straight portion and the non-tapered head tip section less than a width of the straight portion.

3. The magnetic recording head as in claim 1, wherein the tapered neck has a straight profile along tracks on the recording medium.

4. The magnetic recording head as in claim 1, wherein the tapered neck has a third tapered profile on a leading edge along the tracks of the recording medium.

5. The magnetic recording head as in claim 4, wherein the tapered neck has a fourth tapered profile on a trailing edge along the tracks of the recording medium.

6. The magnetic recording head as in claim 4, wherein the tapered neck has a straight profile on a trailing edge along the tracks of the recording medium.

7. The magnetic recording head as in claim 1, wherein the single-pole magnetic write tip comprises a plurality of magnetic layers along the direction substantially perpendicular to the recording medium, wherein two adjacent magnetic layers have equilibrium magnetizations in substantially opposite directions.

8. The magnetic recording head as in claim 7, wherein the single-pole magnetic write tip further comprises a non-magnetic layer formed over side surfaces of the single pole and a ferromagnetic layer formed on the non-magnetic layer without being in contact with the single pole.

9. The magnetic recording head as in claim 1,
wherein the single-pole magnetic write tip further comprises a magnetic exchange decoupling layer formed over side surfaces of the single pole to provide shielding.

10. The device magnetic recording head as in claim 1,
wherein the single-pole magnetic write tip further comprises a magnetic shield comprising a soft magnetic material and surrounding at least the head tip of the single pole magnetic write tip, wherein the magnetic shield is separated from the single pole magnetic write tip.

11. The magnetic recording head as in claim 1,
wherein the single-pole magnetic write tip further comprises a magnetic shield comprising a soft magnetic sheet which is separated from the single pole magnetic write tip and has an aperture, wherein the soft magnetic sheet is positioned to receive a portion of the head tip of the single pole magnetic write tip in the aperture.

12. The magnetic recording head as in claim 1,
wherein the single-pole magnetic write tip further comprises a magnetic shield comprising a soft magnetic sheet which is separated from the single pole magnetic write tip and has an aperture, wherein the soft magnetic sheet is positioned between the head tip of the single pole magnetic write tip and the recording medium to provide an air bearing surface and magnetic shielding, and wherein the head tip interfaces with the recording medium through the aperture.

13. The magnetic recording head as in claim 1, further comprising:
a magnetic shield around the single pole magnetic tip and isolated from the single pole magnetic tip, wherein the magnetic shield is in contact with the return pole.

14. The magnetic recording head as in claim 1, further comprising an anti-ferromagnetic coupling layer formed over side surfaces of the single pole magnetic tip to provide shielding.

15. The magnetic recording head as in claim 1, wherein the single-pole magnetic write head further comprises a magnetic exchange decoupling layer formed over side surfaces of the single pole magnetic head to provide shielding.

16. The magnetic recording head as in claim 1, wherein the single-pole magnetic write tip further comprises an anti-ferromagnetic coupling layer formed over side surfaces of the single pole magnetic write tip to provide shielding.

* * * * *